US011457264B2

(12) United States Patent
Hirabayashi

(10) Patent No.: US 11,457,264 B2
(45) Date of Patent: *Sep. 27, 2022

(54) VIDEO DISPLAY APPARATUS AND TERMINAL APPARATUS

(71) Applicant: Maxell, Ltd., Kyoto (JP)

(72) Inventor: Masayuki Hirabayashi, Kyoto (JP)

(73) Assignee: MAXELL, LTD., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/704,972

(22) Filed: Dec. 5, 2019

(65) Prior Publication Data

US 2020/0120303 A1 Apr. 16, 2020

Related U.S. Application Data

(63) Continuation of application No. 16/433,708, filed on Jun. 6, 2019, now Pat. No. 10,542,232, which is a
(Continued)

(30) Foreign Application Priority Data

Dec. 7, 2012 (JP) .................................. 2012-267765

(51) Int. Cl.
*H04N 21/422* (2011.01)
*H04N 21/433* (2011.01)
(Continued)

(52) U.S. Cl.
CPC ... *H04N 21/42204* (2013.01); *G06Q 30/0267* (2013.01); *H04N 5/44* (2013.01);
(Continued)

(58) Field of Classification Search
CPC ...... H04N 21/42204; H04N 5/44; H04N 5/50; H04N 21/433; H04N 21/42206;
(Continued)

(56) References Cited

U.S. PATENT DOCUMENTS 6,097,441 A 8/2000 Allport
6,317,168 B1 11/2001 Seo
(Continued)

FOREIGN PATENT DOCUMENTS

CN 101510965 A 8/2009
CN 101951368 A 1/2011
(Continued)

OTHER PUBLICATIONS

Office Action issued in corresponding Chinese Patent Application No. 201380063530.4, dated July 4, 2017 with English Translation.
(Continued)

*Primary Examiner* — Michael Lee
(74) *Attorney, Agent, or Firm* — McDermott Will & Emery LLP

(57) ABSTRACT

A terminal apparatus having a function of remotely controlling a video display apparatus includes a communication unit that transmits a command related to setting of the video display apparatus and receives status information, a signal receiving unit that receives a signal output from a broadcast station and decodes a video content, a memory unit that stores a content of a command including a channel of the video content, and a display unit that displays the video content and various types of information. In this terminal apparatus, the communication unit transmits an identification code specific to the terminal apparatus when transmitting the command, and when the status information is received after a channel of the video display apparatus is set by remote control, the video content of the channel stored in the memory unit is decoded by the signal receiving unit and is displayed on the display unit.

4 Claims, 29 Drawing Sheets

Related U.S. Application Data continuation of application No. 15/889,735, filed on Feb. 6, 2018, now Pat. No. 10,375,341, which is a continuation of application No. 14/649,895, filed as application No. PCT/JP2013/079953 on Nov. 6, 2013, now Pat. No. 9,924,124.

(51) Int. Cl.
| | |
|---|---|
| G06Q 30/02 | (2012.01) |
| H04N 5/44 | (2011.01) |
| H04N 5/50 | (2006.01) |
| H04N 21/4227 | (2011.01) |
| H04N 21/45 | (2011.01) |
| H04N 21/475 | (2011.01) |

(52) U.S. Cl.
CPC ............ *H04N 5/50* (2013.01); *H04N 21/433* (2013.01); *H04N 21/4227* (2013.01); *H04N 21/42206* (2013.01); *H04N 21/42224* (2013.01); *H04N 21/4532* (2013.01); *H04N 21/4751* (2013.01)

(58) Field of Classification Search
CPC ......... H04N 21/42224; H04N 21/4227; H04N 21/4532; H04N 21/4751; G06Q 30/0267
See application file for complete search history.

(56) References Cited

U.S. PATENT DOCUMENTS

| | | | |
|---|---|---|---|
| 6,476,825 B1 | 11/2002 | Croy et al. | |
| 6,509,908 B1 | 1/2003 | Croy et al. | |
| 7,924,168 B2 | 4/2011 | Otsu et al. | |
| 8,223,662 B2 | 7/2012 | Deshpande et al. | |
| 8,321,898 B2 | 11/2012 | Yuasa et al. | |
| 8,495,686 B2 | 7/2013 | Maddali et al. | |
| 8,749,426 B1 | 6/2014 | Hastings et al. | |
| 9,003,097 B2 | 4/2015 | Enomoto et al. | |
| 9,031,378 B2 | 5/2015 | Lin | |
| 9,326,035 B1* | 4/2016 | Thompson | H04N 21/44222 |
| 10,397,659 B1* | 8/2019 | Ling | H04N 21/4826 |
| 10,571,991 B2* | 2/2020 | Sprenger | H04N 5/268 |
| 2003/0043789 A1 | 3/2003 | Okajima et al. | |
| 2003/0064709 A1 | 4/2003 | Gailey et al. | |
| 2003/0071117 A1 | 4/2003 | Meade, II | |
| 2003/0073412 A1* | 4/2003 | Meade, II | G08C 17/02 455/3.03 |
| 2003/0091030 A1 | 5/2003 | Yegin et al. | |
| 2004/0008287 A1 | 1/2004 | Johnston et al. | |
| 2005/0030427 A1 | 2/2005 | Yamada | |
| 2005/0235331 A1 | 10/2005 | Lynch | |
| 2006/0085579 A1 | 4/2006 | Sato | |
| 2006/0161964 A1 | 7/2006 | Chung | |
| 2006/0204229 A1 | 9/2006 | Onodera | |
| 2006/0234677 A1 | 10/2006 | Lin et al. | |
| 2006/0245734 A1 | 11/2006 | Amano et al. | |
| 2007/0101370 A1* | 5/2007 | Calderwood | H04N 21/458 725/47 |
| 2007/0127408 A1 | 6/2007 | Sakamoto | |
| 2007/0171198 A1 | 7/2007 | Yokozawa | |
| 2007/0216667 A1 | 9/2007 | Matsuda | |
| 2007/0250864 A1* | 10/2007 | Diaz Perez | H04N 21/4312 725/52 |
| 2008/0034276 A1 | 2/2008 | Ficco | |
| 2008/0165906 A1 | 7/2008 | Ho et al. | |
| 2008/0186411 A1* | 8/2008 | Kondo | H04N 5/4403 348/734 |
| 2008/0201736 A1 | 8/2008 | Gordon et al. | |
| 2008/0231684 A1* | 9/2008 | Underwood | H04N 7/147 348/14.01 |
| 2008/0238755 A1 | 10/2008 | Cruz et al. | |
| 2008/0240283 A1 | 10/2008 | Iwamura | |
| 2008/0295140 A1* | 11/2008 | Praden | H04N 21/4532 725/93 |
| 2008/0313299 A1 | 12/2008 | Ebbe et al. | |
| 2009/0005020 A1* | 1/2009 | McGowan | H04L 65/4084 455/414.3 |
| 2009/0055540 A1 | 2/2009 | Foti et al. | |
| 2009/0058597 A1 | 3/2009 | Shibagaki et al. | |
| 2009/0070840 A1 | 3/2009 | Kamimaki et al. | |
| 2009/0113417 A1 | 4/2009 | Vrijsen | |
| 2009/0129689 A1 | 5/2009 | Boyce | |
| 2009/0201855 A1 | 8/2009 | Weniger et al. | |
| 2009/0220209 A1 | 9/2009 | Mori | |
| 2010/0023975 A1* | 1/2010 | Gupta | H04N 21/482 725/62 |
| 2010/0031288 A1* | 2/2010 | Scott | H04N 7/17318 725/38 |
| 2010/0053441 A1 | 3/2010 | Tokashiki et al. | |
| 2010/0058414 A1* | 3/2010 | Ryals | H04N 7/17318 725/110 |
| 2010/0070997 A1 | 3/2010 | Friedman | |
| 2010/0109973 A1 | 5/2010 | Byun | |
| 2010/0157978 A1 | 6/2010 | Robbins et al. | |
| 2010/0158109 A1 | 6/2010 | Dahlby et al. | |
| 2010/0169912 A1* | 7/2010 | Limbasia | H04N 21/2543 725/25 |
| 2010/0235862 A1 | 9/2010 | Adachi | |
| 2010/0254670 A1 | 10/2010 | Amsterdam et al. | |
| 2010/0287480 A1* | 11/2010 | Hicks, III | H04L 12/2827 709/218 |
| 2011/0032424 A1 | 2/2011 | VanDuyn et al. | |
| 2011/0047583 A1* | 2/2011 | Howard | H04W 8/30 725/109 |
| 2011/0072459 A1* | 3/2011 | Hiraoka | H04N 21/426 725/38 |
| 2011/0085088 A1* | 4/2011 | Modi | H04N 5/46 348/732 |
| 2011/0124282 A1* | 5/2011 | Lee | H04H 20/57 455/3.01 |
| 2011/0138416 A1 | 6/2011 | Kang et al. | |
| 2011/0164188 A1* | 7/2011 | Karaoguz | G06F 3/011 348/734 |
| 2011/0169976 A1* | 7/2011 | Carter | H04N 21/4223 348/222.1 |
| 2011/0211131 A1 | 9/2011 | Kikuchi et al. | |
| 2011/0289543 A1 | 11/2011 | Goosen et al. | |
| 2011/0314510 A1 | 12/2011 | Dai | |
| 2012/0026299 A1* | 2/2012 | Arai | H04N 13/106 348/49 |
| 2012/0054790 A1 | 3/2012 | Kim | |
| 2012/0084653 A1* | 4/2012 | Kota | G06F 3/14 715/720 |
| 2012/0159536 A1 | 6/2012 | Treacy et al. | |
| 2012/0173753 A1 | 7/2012 | Moorthy | |
| 2012/0223819 A1 | 9/2012 | Burgess et al. | |
| 2012/0224043 A1* | 9/2012 | Tsurumi | H04N 21/4223 348/78 |
| 2012/0262494 A1* | 10/2012 | Choi | G06F 3/0481 345/619 |
| 2012/0266093 A1* | 10/2012 | Park | H04N 21/4122 715/811 |
| 2012/0281141 A1* | 11/2012 | Kitazato | H04N 21/2358 348/553 |
| 2012/0301100 A1* | 11/2012 | Pereira | H04N 21/2743 386/224 |
| 2013/0027613 A1 | 1/2013 | Kim et al. | |
| 2013/0031162 A1* | 1/2013 | Willis | H04L 65/1069 709/203 |
| 2013/0031594 A1 | 1/2013 | Sansom et al. | |
| 2013/0040623 A1 | 2/2013 | Chun et al. | |
| 2013/0312040 A1 | 11/2013 | Kim et al. | |
| 2013/0330053 A1 | 12/2013 | Lee et al. | |
| 2013/0332956 A1* | 12/2013 | Lee | H04M 1/72533 725/37 |
| 2014/0033900 A1 | 2/2014 | Chapman et al. | |
| 2014/0047467 A1* | 2/2014 | Arling | H04N 21/44231 725/14 |
| 2014/0047468 A1* | 2/2014 | Nielsen | H04N 21/8358 725/14 |

(56) References Cited

U.S. PATENT DOCUMENTS

| | | | | |
|---|---|---|---|---|
| 2014/0090003 A1* | 3/2014 | Eguchi | H04N 21/64322 | 725/116 |
| 2014/0118625 A1* | 5/2014 | Cho | H04N 5/44513 | 348/734 |
| 2014/0146740 A1* | 5/2014 | Yamashina | H04L 45/308 | 370/315 |
| 2014/0229994 A1 | 8/2014 | Fell et al. | | |
| 2015/0319490 A1* | 11/2015 | Besehanic | H04N 21/258 | 725/19 |
| 2016/0044074 A1* | 2/2016 | Pingenot | H04L 67/1002 | 709/227 |
| 2017/0366842 A1* | 12/2017 | Shoykher | H04N 21/42203 | |

FOREIGN PATENT DOCUMENTS

| | | | |
|---|---|---|---|
| JP | 08-008668 A | 1/1996 | |
| JP | 11-196345 A | 7/1999 | |
| JP | 2000-125223 A | 4/2000 | |
| JP | 2001-275090 A | 10/2001 | |
| JP | 2001-333346 A | 11/2001 | |
| JP | 2003-69906 A | 3/2003 | |
| JP | 2006-086931 A | 3/2006 | |
| JP | 2007-158806 A | 6/2007 | |
| JP | 2007-184746 A | 7/2007 | |
| JP | 2007-208872 A | 8/2007 | |
| JP | 2007-251369 A | 9/2007 | |
| JP | 2009-65305 A | 3/2009 | |
| JP | 2010-074579 A | 4/2010 | |
| WO | 2013/050197 A1 | 4/2013 | |

OTHER PUBLICATIONS

International Search Report issued in corresponding International Application No. PCT/JP2013/079953, dated Feb. 18, 2014, with English Translation.

Non-Final Office Action issued in corresponding parent U.S. Appl. No. 14/649,895, dated May 26, 2017.

Non-Final Office Action issued in corresponding parent U.S. Appl. No. 14/649,895, dated Jan. 4, 2016.

Final Office Action issued in corresponding parent U.S. Appl. No. 14/649,895, dated Sep. 9, 2016.

Notice of Allowance issued in corresponding parent U.S. Appl. No. 14/649,895, dated Nov. 29, 2017.

Notice of Allowance issued in related parent U.S. Appl. No. 16/433,708, dated Nov. 4, 2019.

Non-Final Office Action issued in related parent U.S. Appl. No. 15/889,735, dated Jan. 25, 2019.

Notice of Allowance issued in related parent U.S. Appl. No. 15/889,735, dated Mar. 22, 2019.

Y. Yamaguchi et al., "Connectable? Connect! Wireless-Wired LAN", Jan. 5, 2010, first edition, pp. 123-128, with English translation.

Japanese Notice of Reasons for Refusal issued in corresponding Japanese Patent Application No. 2018-242467, dated Jul. 30, 2019, with English translation.

Japanese Office Action issued in corresponding Japanese Patent Application No. 2017-137105, dated Jul. 10, 2018, with English Translation.

Brodkin, Jon "AirPlay for all? Miracast promises video streaming without the router," arsTECHNICA, BIZ & IT, [online], Jul. 10, 2012 [Retrieved on Dec. 28, 2021] Retrieved from the Internet:<URL: https://arstechnica.com/information-technology/2012/07/airplay-for-all-miracast-promises-video-streaming-without-the-router/>.

Newsroom (News & Events for The Wi-Fi Alliance) [online]. Austin (TX): www.wi-fi.org, May 31, 2012 [Retrieved on Dec. 28, 2021] Retrieved from the Internet: <https://www.wi-fi.org/news-events/newsroom/wi-fi-alliance-to-launch-wi-fi-certified-miracast-to-deliver-display>, message: Wi-Fi Alliance® to Launch Wi-Fi Certified Miracast™ to Deliver Display Applications.

\* cited by examiner

VIDEO DISPLAY APPARATUS AND TERMINAL APPARATUS

CROSS-REFERENCE TO RELATED APPLICATIONS

This application is a Continuation of U.S. patent application Ser. No. 16/433,708, filed on Jun. 6, 2019, which is a Continuation of U.S. patent application Ser. No. 15/889,735, filed on Feb. 6, 2018, now U.S. Pat. No. 10,375,341, issued on Aug. 6, 2019, which is a Continuation of U.S. patent application Ser. No. 14/649,895, filed on Jun. 4, 2015, now U.S. Pat. No. 9,924,124, issued on Mar. 20, 2018, which is a National Phase of PCT/JP2013/079953, filed on Nov. 6, 2013, which claims priority to Japanese Patent Application No. 2012-267765, filed on Dec. 7, 2012. The subject matter of each is incorporated herein by reference in entirety.

TECHNICAL FIELD

The present invention relates to a video display apparatus and a terminal apparatus.

BACKGROUND ART

As a background art in this technical field, there is Japanese Patent Application Laid-Open Publication No. 2009-65305 (Patent Document 1). An object of the invention described in this publication is "To provide a technique for appropriately providing a seamless viewing style without depending on places by a terminal apparatus and a large-screen information receiving terminal apparatus".

As a solution to this issue, the publication describes "An information receiving terminal apparatus includes means for transmitting mobile viewing information to a terminal apparatus, and a video information system controls a viewing environment for satisfying respective requests from two or more users, and is configured to enable the continuous viewing of a content viewed at the information receiving terminal apparatus by the transmission and reception of the content to and from the terminal apparatus and enable the continuous viewing conversely at the information receiving terminal of the content viewed at the terminal apparatus based on inter-terminal cooperation and center cooperation of time code information for continuing content viewing from the information receiving terminal apparatus to the terminal apparatus.".

Also, as another background art, there is Japanese Patent Application Laid-Open Publication No. 2001-275090 (Patent Document 2). An object described in this publication is "To provide a broadcast receiving apparatus capable of preventing a main story after a CM from being missed".

As a solution to this issue, the publication describes "A broadcast receiving apparatus 10 includes first and second tuners 13a and 13b that receive broadcasting and a RAM 18 that stores a received video, when a program on a channel which is being received by the first tuner 13a is being output, a predetermined amount of video of the program immediately before a most recent CM is stored in the RAM 18, when an instruction to switch the channel to another channel is issued during the CM, the other channel is received by the second tuner 13b and a program on the other channel is output instead of the program on the channel being received by the first tuner 13a, and when the video immediately before the CM stored in the RAM 18 and the video on the channel being received by the first tuner 13a are approximate to each other, the end of the CM is output".

RELATED ART DOCUMENTS

Patent Documents

Patent Document 1: Japanese Patent Application Laid-Open Publication No. 2009-65305
Patent Document 2: Japanese Patent Application Laid-Open Publication No. 2001-275090

SUMMARY OF THE INVENTION

Problems to be Solved by the Invention

As an effect of the invention, the above-mentioned Patent Document 1 describes "While viewing a content with a family in a living room by a large-screen receiving terminal apparatus (e.g., a television receiver), each individual can acquire information and data for the convenience of the individual by a terminal apparatus which is held at hand and carried by each individual.", and this is convenient to use when a plurality of users continue to view the same content. However, the Patent Document 1 does not take into consideration the case where the plurality of users respectively view different contents.

For example, Patent Document 1 does not particularly take into consideration the fact that, when a plurality of users view a television broadcasting by one video display apparatus and one of the users switches a channel, the other users cannot continue to view the channel before the switching.

Also, according to Patent Document 2, it is possible to prevent a main story after a CM from being missed.

However, Patent Document 2 describes "Event information including a type, a title, and a start time of an event such as a CM is incorporated into data for digital broadcasting.", and has an issue that the CM cannot be specified without such an operation.

Thus, an object of the present invention is to provide user-friendly video display apparatus and terminal apparatus.

Means for Solving the Problems

To solve the above-mentioned issue, for example, a configuration described in the scope of the claims is adopted.

The present application includes a plurality of means for solving the issue mentioned above, and one example thereof is a terminal apparatus having a remote control function of a video display apparatus, and the terminal apparatus includes: a communication unit that transmits a command related to setting of the video display apparatus and receives status information; a signal receiving unit that receives a signal output from a broadcast station and decodes a video content; a memory unit that stores a content of a command including a channel of the video content; and a display unit that displays the video content and various types of information. In the terminal apparatus, the communication unit transmits an identification code specific to the terminal apparatus when transmitting the command, and when the status information is received after a channel of the video display apparatus is set by remote control, the video content of the channel stored in the memory unit is decoded by the signal receiving unit and is displayed on the display unit.

Also, another example thereof is a terminal apparatus having a function of remotely controlling a video display apparatus that displays a video of a television program and a video serving as advertisement means accompanying a television program, and the terminal apparatus includes: a transmission unit that transmits a command related to setting of the video display apparatus; a television signal receiving unit that receives a television signal; and a memory unit that stores a channel that has been viewed without being switched for a predetermined period of time. In the terminal apparatus, the television signal receiving unit detects a start timing and an end timing of the video serving as the advertisement means, and when a channel selection button of a remote control function is pressed in a period of time from the start timing to the end timing, the transmission unit transmits a setting command of the channel, and further transmits a setting command of the channel stored in the memory unit in response to the end timing.

Effects of the Invention

According to the present invention, it is possible to provide user-friendly video display apparatus and terminal apparatus.

Issues, configurations, and effects other than the foregoing will become apparent from the following description of embodiments.

BRIEF DESCRIPTIONS OF THE DRAWINGS

DETAILED DESCRIPTION OF PREFERRED EMBODIMENTS

Hereinafter, embodiments will be described with reference to the drawings.

First Embodiment

Figure 1:
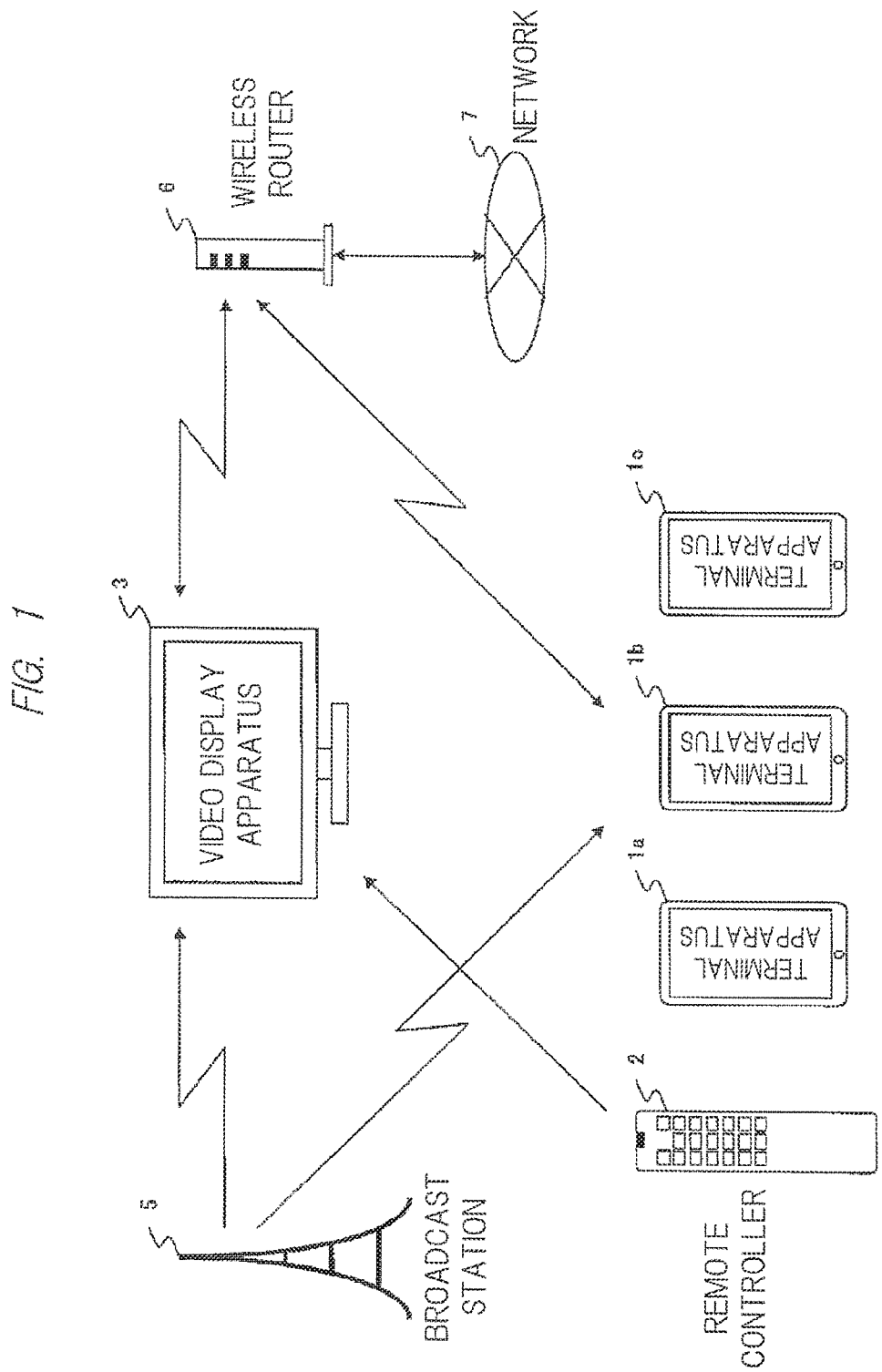
FIG. 1 is a diagram illustrating a configuration of a video display system according to the first embodiment.

FIG. 1 is a diagram illustrating a configuration of a video display system according to the first embodiment of the present invention. The video display system according to the present embodiment includes a plurality of terminal apparatuses 1 and a video display apparatus 3.

The terminal apparatus 1 has a wireless communication function, and can transmit and receive various types of information to and from an Internet network. Also, the terminal apparatus 1 has a function of performing the control of the video display apparatus 3 in a remote place (hereinafter referred to as "remote control"), and a user can control a channel and an audio volume of the video display apparatus 3 by using the terminal apparatus 1. When the plurality of terminal apparatuses 1 need to be distinguished from one another, the terminal apparatuses 1 are written as terminal apparatuses 1a, 1b, 1c, . . . and the like.

A remote controller 2 is a control apparatus dedicated to the video display apparatus 3, and can operate the video display apparatus 3 by infrared rays.

The video display apparatus 3 is an apparatus that receives and displays a video content, and can receive, for example, a television signal by wireless or by wire from a broadcast station 5 and display a video content based on the television signal. Also, the video display apparatus 3 can display a video content received from a network 7 via a wireless router 6, for example, an Internet content of a URL (Uniform Resource Locator) specified by the user or the like. Thus, the video display apparatus 3 can receive and display a video content delivered from a delivery source specified by the user or the like, for example, a specific broadcast station 5 and URL. The number of video display apparatuses 3 is not limited to one and a plurality of video display apparatuses 3 may be provided. Further, the terminal apparatus 1 also can receive and display the video content.

The broadcast station 5 is an apparatus that outputs a television signal.

The wireless router 6 has a wireless LAN (Local Area Network) function such as Wi-Fi (Wireless Fidelity), and can be connected to the network 7 via a communication network. The terminal apparatus 1 and the video display apparatus 3 can acquire and display a video content and various types of information from the internet network by being connected to the wireless router 6. Alternatively, although an example in which the wireless router 6 and the video display apparatus 3 are connected to each other by wireless has been illustrated, they may be connected to each other by wire.

Figure 2:
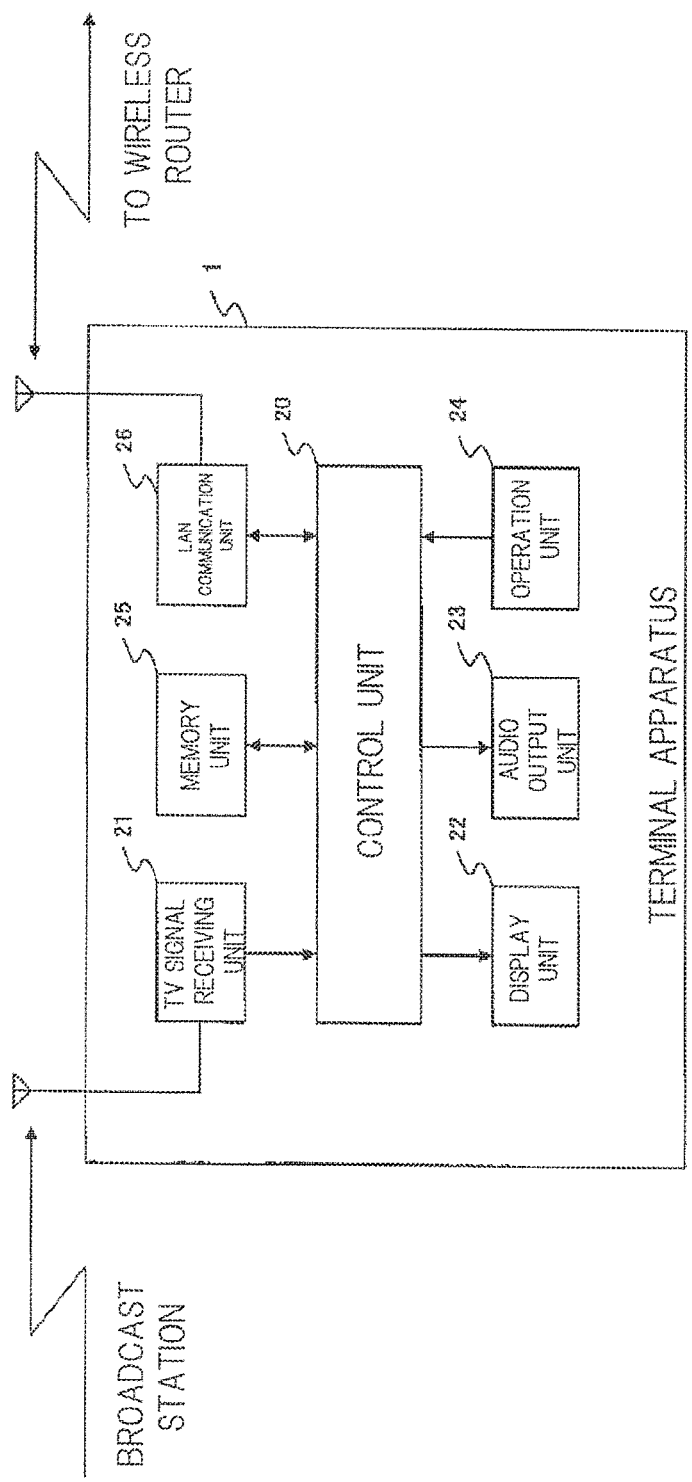
FIG. 2 is a block diagram illustrating a configuration of a terminal apparatus according to the first embodiment.

FIG. 2 is a block diagram illustrating a configuration of the terminal apparatus 1 illustrated in FIG. 1.

A control unit 20 controls each of the units in the terminal apparatus 1. The control unit 20 is made up of a CPU (Central Processing Unit) or any control circuit or a dedicated circuit such as an ASIC (Appreciation Specific IC).

A television signal receiving unit 21 is made up of a signal processing circuit including a tuner, a decoding circuit and others in addition to an antenna, and receives a television signal output from the broadcast station 5, decodes a video and an audio, and sends the decoded video and audio to a display unit 22 and an audio output unit 23.

The display unit 22 is, for example, a liquid crystal panel and displays various types of information. The audio output unit 23 is made up of, for example, an amplifier and a speaker, and outputs various types of audios. An operation unit 24 is, for example, a touch pad, and receives an operation by the user and transmits an instruction based on the operation to the control unit 20. An apparatus obtained by integrating and combining the liquid crystal panel and the touch pad is generally referred to as a touch panel, and an example using the touch panel is described in the present embodiment.

A memory unit 25 is made up of a ROM (Read Only Memory), a RAM (Random Access Memory), a flash ROM, and the like, and stores a program for controlling the terminal apparatus 1, various types of setting values and video contents, and the like.

A LAN communication unit 26 transmits various types of commands to the video display apparatus 3 via the wireless router 6 or the like by using, for example, Wi-Fi. Further, the LAN communication unit 26 receives status information or the like from the video display apparatus 3. The command is information with which the terminal apparatus 1 performs the remote control of the video display apparatus 3, and examples of the command include a power supply command for issuing an instruction to switch ON and OFF of a power supply and a setting command for designating a specific channel and audio volume. The status information includes information capable of specifying whether remote control can be performed. Alternatively, the LAN communication unit 26 may directly transmit and receive the command and the status information to and from the video display apparatus 3 without the wireless router 6 and the like by using, for example, infrared rays, Wi-Fi Direct, or Bluetooth (registered trademark).

When the command is transmitted, an identification code specific to the terminal apparatus 1 is also transmitted. An ID (identification) individually assigned to the terminal apparatus 1, a telephone number, and the like can be applied as the identification code. Generally, since it is assumed that one user possesses one terminal apparatus 1, for example, a user ID given to each user by a manufacturer of the terminal apparatus 1 may be applied. In this case, the user ID is previously stored in the terminal apparatus 1 based on an operation by the user or the like.

Figure 3:
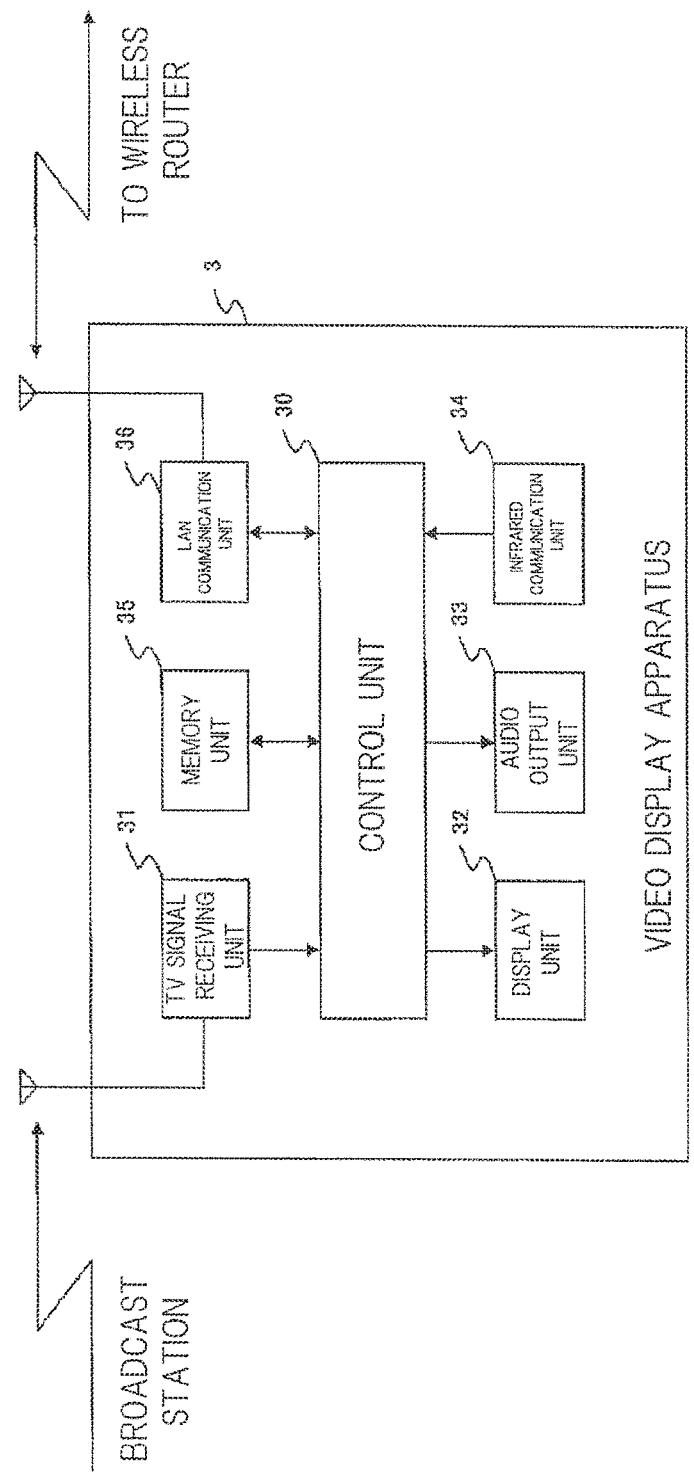
FIG. 3 is a block diagram illustrating a configuration of a video display apparatus according to the first embodiment.

FIG. 3 is a block diagram illustrating a configuration of the video display apparatus 3 illustrated in FIG. 1.

A control unit 30 controls each of the units in the video display apparatus 3. The control unit 30 is made up of a CPU or any control circuit or a dedicated circuit such as an ASIC.

A television signal receiving unit 31 is made up of, for example, a signal processing circuit including a tuner and a decoding circuit in addition to an antenna, and receives a television signal output from the broadcast station 5, decodes a video and an audio, and sends the decoded video and audio to a display unit 32 and an audio output unit 33. The television signal receiving unit 31 includes a plurality of signal processing circuits described above or the like, and can simultaneously receive a plurality of channels.

The display unit 32 is made up of, for example, a liquid crystal panel, a plasma panel, or an organic EL (ElectroLuminescence) panel, and displays various types of video contents and various types of information.

An audio output unit 33 is made up of, for example, an amplifier and a speaker, and outputs various types of audios.

An infrared communication unit 34 receives a control command transmitted from a terminal apparatus having an infrared communication function or the dedicated remote controller 2 by using, for example, infrared rays, and transmits the instruction to the control unit 30.

A memory unit 35 is made up of a ROM, a RAM, a flash ROM, and the like, and stores an identification code of the terminal apparatus 1, which has transmitted a power supply command, in addition to a program for controlling the video display apparatus 3 and various types of setting and video contents. A storage such as an HDD (Hard Disc Drive) or a BD (Blu-ray (registered trademark) Disc) drive may be equipped.

A LAN communication unit 36 is connected to the wireless router 6 by wire or by wireless, and can receive a video content or the like from the Internet network or the like. Also, the LAN communication unit 36 receives various types of commands from the terminal apparatus 1 via the wireless router 6 or the like by using, for example, Wi-Fi. Also, the LAN communication unit 36 transmits status information to the terminal apparatus 1. The LAN communication unit 36 may directly transit and receive the command and the status information to and from the terminal apparatus 1 without the wireless router 6 or the like by using, for example, infrared rays, Wi-Fi Direct, or Bluetooth.

Figure 4:
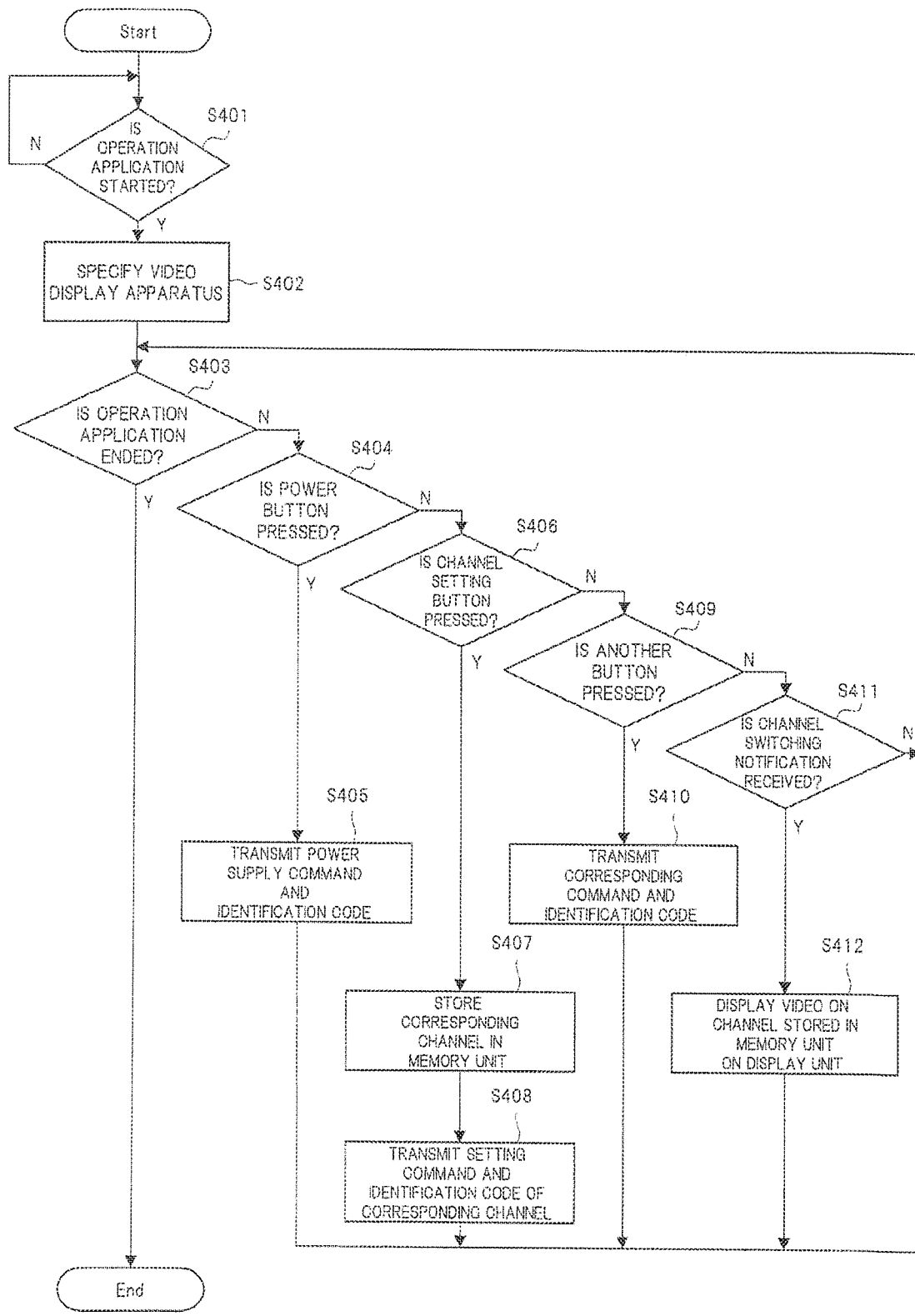
FIG. 4 is a flowchart illustrating a process of the terminal apparatus according to the first embodiment.

FIG. 4 is a flowchart illustrating a process of the terminal apparatus 1 according to the first embodiment of the present invention. This flowchart illustrates the process in the case where the terminal apparatus 1 performs the remote control of the video display apparatus 3.

In step S401, the terminal apparatus 1 waits until application software for performing the remote control of the video display apparatus 3 (hereinafter referred to as "operation application") is started based on an operation by a user.

Figure 5A:
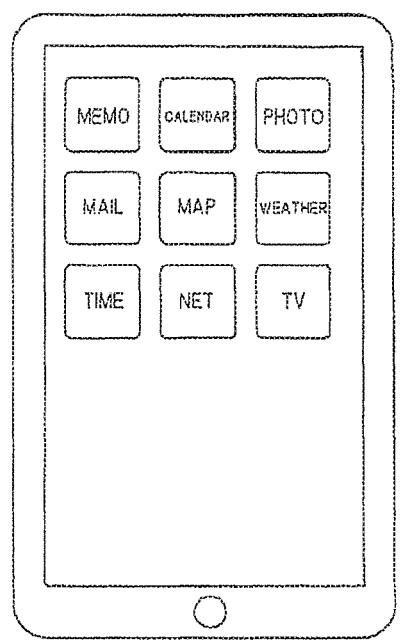
FIG. 5A illustrates an example of display on a screen of the terminal apparatus according to the first embodiment.

FIGS. 5A-5D illustrate an example of various types of display on the touch-panel display unit 22 in the terminal apparatus 1. FIG. 5A illustrates a menu screen on which various types of application software are arranged in the terminal apparatus 1. When the user presses, for example, a "television" button displayed on the touch panel, the operation application is started.

Figure 5B:
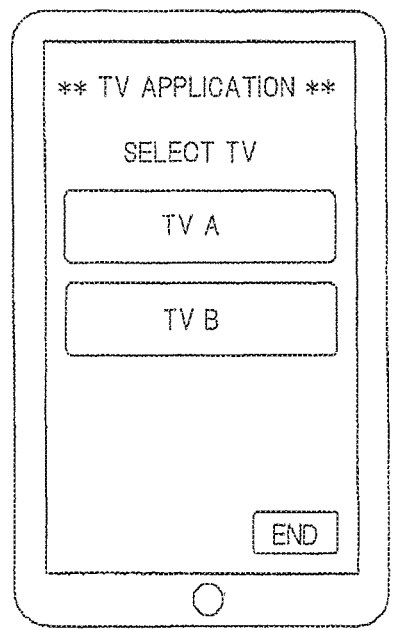
FIG. 5B illustrates an example of display on a screen of the terminal apparatus according to the first embodiment.

In step S402, the terminal apparatus 1 selects the video display apparatus 3 serving as a target of the remote control based on the operation by the user. FIG. 5B illustrates an example of display on a selection screen in the case where there are two video display apparatuses 3 that can be selected as a target of the remote control. Here, it is assumed that a "television A" is selected.

Figure 5C:
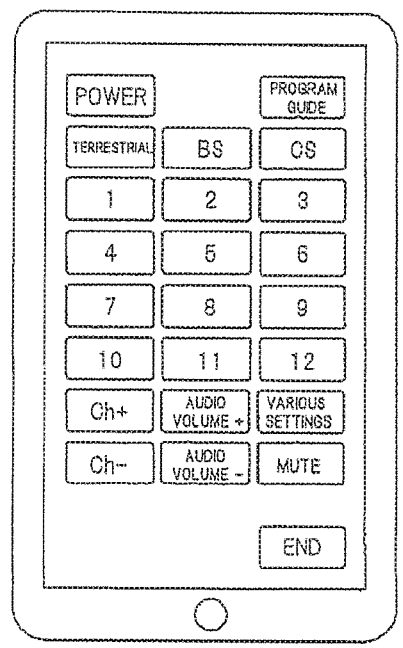
FIG. 5C illustrates an example of display on a screen of the terminal apparatus according to the first embodiment.

When the video display apparatus 3 serving as a target of the remote control is selected, the terminal apparatus 1 displays various types of instructions that can be transmitted to the video display apparatus 3. FIG. 5C illustrates an example of display on an operation screen of the video display apparatus 3 in that case.

Next, in step S403, the terminal apparatus 1 confirms whether the user has performed an operation for ending the operation application. When the operation for ending the operation application, for example, the operation of pressing an "end" button displayed on the terminal apparatus 1 has been performed, the terminal apparatus 1 returns to a process of displaying a menu screen.

In step S404, the terminal apparatus 1 confirms whether the user has pressed a "power" button. When the "power" button displayed on the terminal apparatus 1 has been pressed, the terminal apparatus 1 transmits a power supply command and an identification code to the video display apparatus 3 (step S405), and repeats the process from step S403.

When the "power" button displayed on the terminal apparatus 1 has not been pressed, in step S406, the terminal apparatus 1 confirms whether the user has pressed a channel setting button of a remote control function. When a channel setting button such as a "1" button or a "2" button displayed on the terminal apparatus 1 has been pressed, the process proceeds to step S407, and the corresponding channel is stored in the memory unit 25.

When the "1" button has been pressed, for example, "1" is stored in the memory unit 25. However, when "Ch+" has been then pressed, "2" is stored in the memory unit 25. When a setting command is specified by a relative value such as "Ch+" or "Ch−" like this, an absolute value such as "2" is substituted and stored.

Next, in step S408, the terminal apparatus 1 transmits a selection command and an identification code of the corresponding channel to the video display apparatus 3, and repeats the process from step S403.

When the channel setting button displayed on the terminal apparatus 1 has not been pressed, in step S409, the terminal apparatus 1 confirms whether the other button has been pressed. Examples of the other button include an audio volume setting button.

When the user has issued an instruction to change setting of the video display apparatus 3, the terminal apparatus 1 transmits a corresponding setting command and identification code to the video display apparatus 3 (step S410), and repeats the process from step S403.

When the other button displayed on the terminal apparatus 1 has not been pressed, in step S411, the terminal apparatus 1 confirms whether a channel switching notification has been received as status information.

When the channel switching notification has been received, the terminal apparatus 1 sets the channel stored in the memory unit 25 to the television signal receiving unit 31, and displays a received video on the display unit 22 and outputs an audio from the audio output unit 23 (step S412), and repeats the process from step S403.

The channel switching notification is transmitted from the video display apparatus 3. For example, when channel switching by the terminal apparatus 1b other than the terminal apparatus 1a, which has powered on the video display apparatus 3, has occurred, the video display apparatus 3 transmits the channel switching notification as status information to the terminal apparatus 1a.

When the terminal apparatus 1 has not received the channel switching notification, the terminal apparatus 1 repeats the process from step S403.

Figure 6:
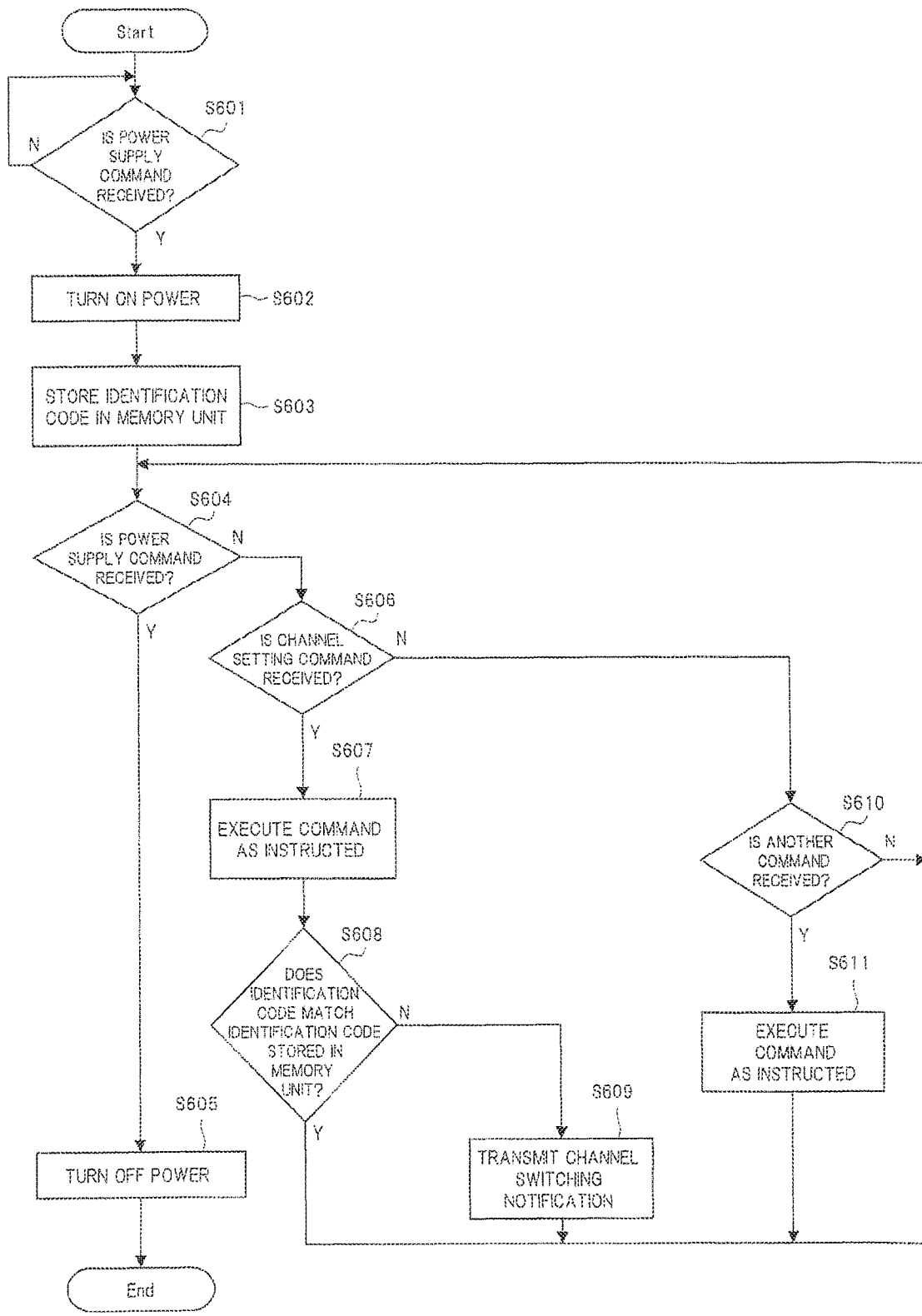
FIG. 6 is a flowchart illustrating a process of the video display apparatus according to the first embodiment.

FIG. 6 is a flowchart illustrating a process of the video display apparatus according to the first embodiment of the present invention. This flowchart illustrates the process performed when the video display apparatus 3 is remotely controlled by the terminal apparatus 1.

In step S601, the video display apparatus 3 waits for receiving of a power supply command. When the power supply command has been received, the process proceeds to step S602, and the video display apparatus 3 is powered on. Then, in step S603, an identification code when the power supply command has been received is stored in the memory unit 35. Here, it is assumed that an identification code of the terminal apparatus 1a has been received.

Next, in step S604, the video display apparatus 3 confirms whether the power supply command has been received again. When the power supply command has been received, the process proceeds to step S605, and the video display apparatus 3 is powered off, and the process ends.

While toggle control to repeat power on/off every time the video display apparatus 3 receives the power supply command is illustrated as an example in the present embodiment, a power-on command and a power-off command may be separated from each other.

When the video display apparatus 3 has not received the power supply command in step S604, the process proceeds to step S606, and the video display apparatus 3 confirms whether a channel setting command has been received. When the channel setting command has been received, the process proceeds to step S607, and the command is executed as instructed.

Next, in step S608, the video display apparatus 3 confirms whether an identification code when the channel setting command has been received matches the identification code stored in the memory unit 35. When the identification codes match each other, the process from step S604 is repeated.

When the identification codes do not match each other, the video display apparatus 3 transmits a channel switching notification as status information to the terminal apparatus 1a corresponding to the identification code stored in the memory unit 35 (step S609), and repeats the process from step S604.

Also, when the video display apparatus 3 has not received the channel setting command in step S606, the process proceeds to step S610, and the video display apparatus 3 confirms whether the other command has been received. When the other command has been received, the video display apparatus 3 executes the command as instructed (step S611), and repeats the process from step S604. Examples of the other command include an audio volume setting command.

When the other command has not been received, the process from step S604 is repeated.

When the terminal apparatus 1a powers on the video display apparatus 3 by remote control in the above-described manner, the video display apparatus 3 is powered on.

Next, when the terminal apparatus 1a performs channel switching of the video display apparatus 3 by remote control, the channel of the video display apparatus 3 is switched as instructed. When another terminal apparatus 1b performs channel switching of the video display apparatus 3 by remote control, the channel of the video display apparatus 3 is switched as instructed, and a channel switching notification is transmitted as status information to the terminal apparatus 1a.

When the terminal apparatus 1a has received the channel switching notification, the terminal apparatus 1a displays the video of the channel prior to the switching by the terminal apparatus 1b on the display unit 22, and outputs the audio thereof from the audio output unit 23.

Figure 5D:
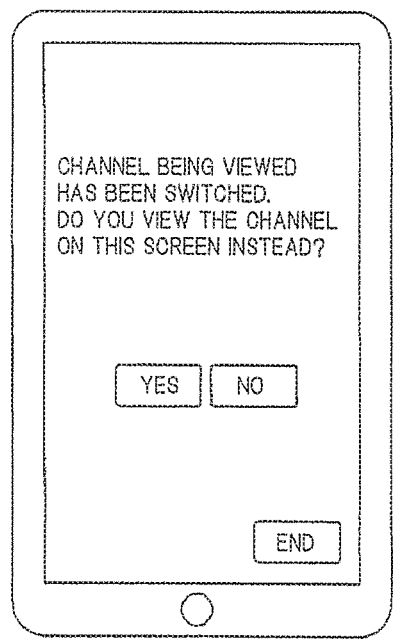
FIG. 5D illustrates an example of display on a screen of the terminal apparatus according to the first embodiment.

Note that it is also possible to ask the user whether the start of the display of the video and the output of the audio is permitted before the display of the video and the output of the audio are started. FIG. 5D illustrates an example of display on a screen of the terminal apparatus 1 at this time. Alternatively, it is also possible to ask the user whether the display and output may be continued after they are started.

By the foregoing configuration, in the first embodiment of the present invention, when the channel of the video display apparatus set by the remote control from a terminal apparatus is switched by another terminal apparatus, a content displayed on the video display apparatus prior to the switching is displayed on the terminal apparatus. Even if a channel set by a user is switched by another user, the user can view the channel by using the terminal apparatus at hand without any particular operation. Thus, it is possible to prevent the content from being missed.

Second Embodiment

Figure 7:
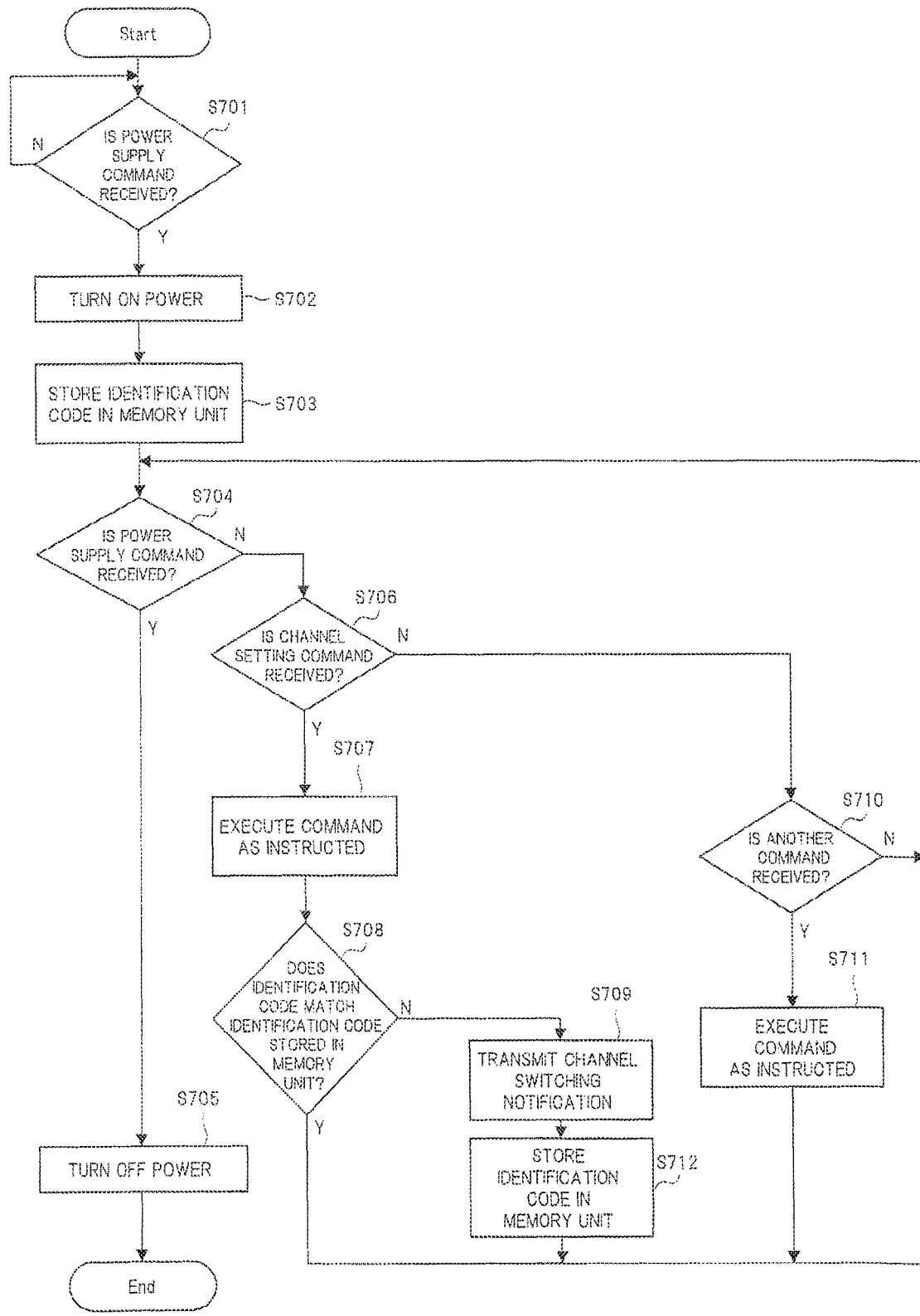
FIG. 7 is a flowchart illustrating a process of a video display apparatus according to the second embodiment.

FIG. 7 is a flowchart illustrating a process of a video display apparatus according to the second embodiment of the present invention.

Since steps S701 to S707 are similar to steps S601 to S607 illustrated in FIG. 6, the description thereof is omitted.

In step S708, the video display apparatus 3 confirms whether an identification code when a channel setting command has been received matches an identification code stored in the memory unit 35. When the identification codes match each other, the video display apparatus 3 repeats the process from step S704.

When the identification codes do not match each other, the video display apparatus 3 transmits a channel switching notification as status information to the terminal apparatus 1a corresponding to the identification code stored in the memory unit 35 (step S709). Next, the video display apparatus 3 stores the identification code when the channel setting command has been received in the memory unit 35 (step S712), and repeats the process from step S704. Here, it is assumed that an identification code of the terminal apparatus 1b has been received.

Since steps S710 to S711 are similar to steps S610 to S611 illustrated in FIG. 6, description thereof is omitted.

When the terminal apparatus 1a powers on the video display apparatus 3 by remote control in this manner, the video display apparatus 3 is powered on.

Next, when the terminal apparatus 1a performs channel switching of the video display apparatus 3 by remote control, the channel of the video display apparatus 3 is switched as instructed. When another terminal apparatus 1b performs channel switching of the video display apparatus 3 by remote control, the channel of the video display apparatus 3 is switched as instructed, and a channel switching notification is transmitted as status information to the terminal apparatus 1a.

When the terminal apparatus 1a receives the channel switching notification, the terminal apparatus 1a displays the video of the channel prior to the switching by the terminal apparatus 1b on the display unit 22, and outputs an audio thereof from the audio output unit 23.

When a terminal apparatus 1c further switches the channel of the video display apparatus 3 by remote control, the channel of the video display apparatus 3 is switched as instructed, and a channel switching notification is transmitted as status information to the terminal apparatus 1b.

When the terminal apparatus 1b receives the channel switching notification, the terminal apparatus 1b displays the video of the channel prior to the switching by the terminal apparatus 1c on the display unit 22, and outputs an audio thereof from the audio output unit 23.

By the foregoing configuration, in the second embodiment of the present invention, a similar effect to that in the first embodiment can be obtained.

Thus, when the channel of the video display apparatus set by the remote control from a terminal apparatus is switched by another terminal apparatus and the channel is further switched by still another terminal apparatus, a content displayed on the video display apparatus prior to the switching is displayed on each of the terminal apparatuses. Even if a channel set by a user is switched by another user, the user can view the channel by using the terminal apparatus at hand without any particular operation. Thus, it is possible to prevent the content from being missed.

Third Embodiment

Figure 8:
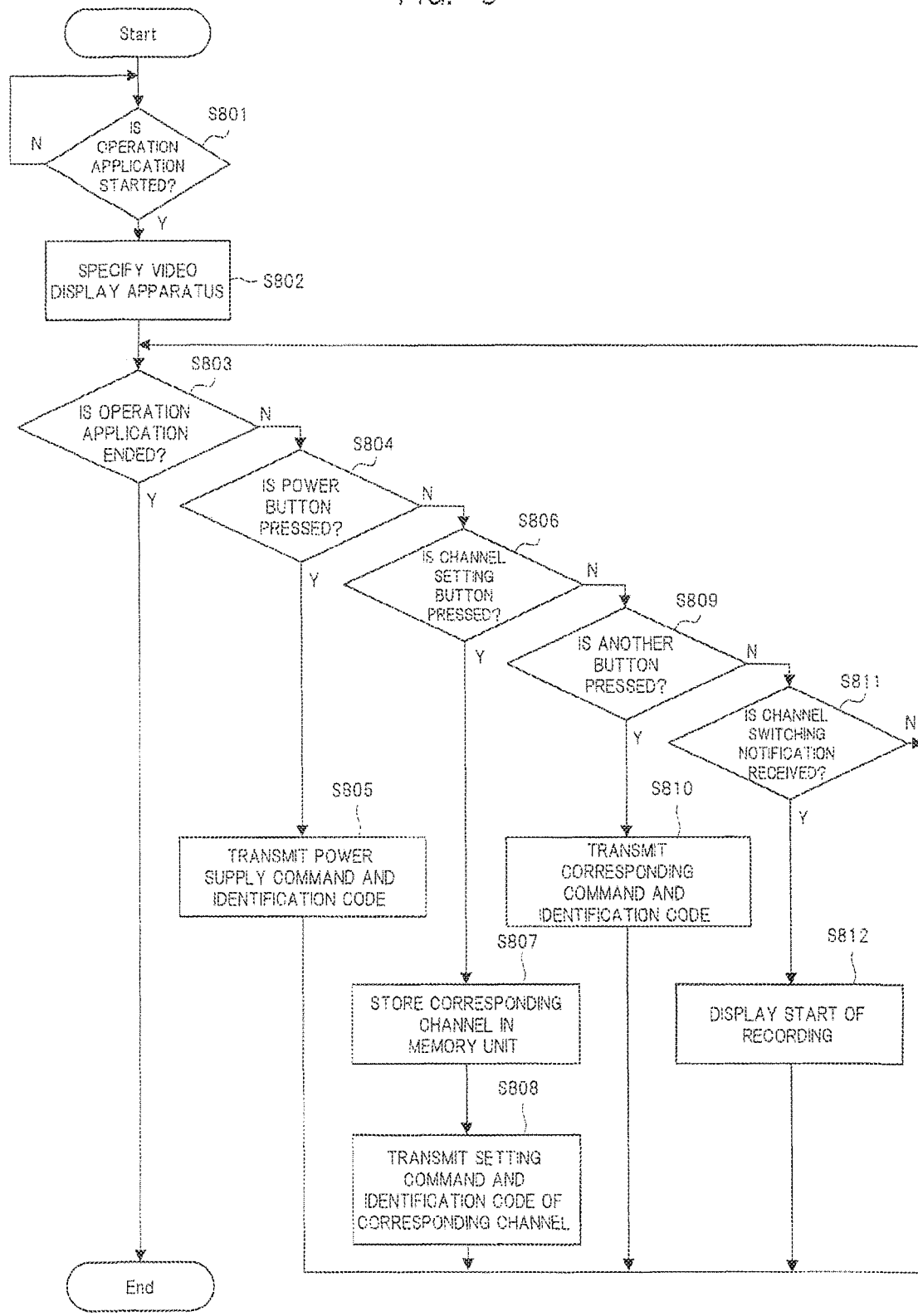
FIG. 8 is a flowchart illustrating a process of a terminal apparatus according to the third embodiment.

FIG. 8 is a flowchart illustrating a process of a terminal apparatus 1 according to the third embodiment of the present invention. This flowchart illustrates the process performed when the terminal apparatus 1 performs the remote control of a video display apparatus 3.

Since steps S801 to S810 are similar to steps S401 to S410 illustrated in FIG. 4, description thereof is omitted.

In step S811, the terminal apparatus 1 confirms whether a channel switching notification has been received as status information.

Figure 13A:
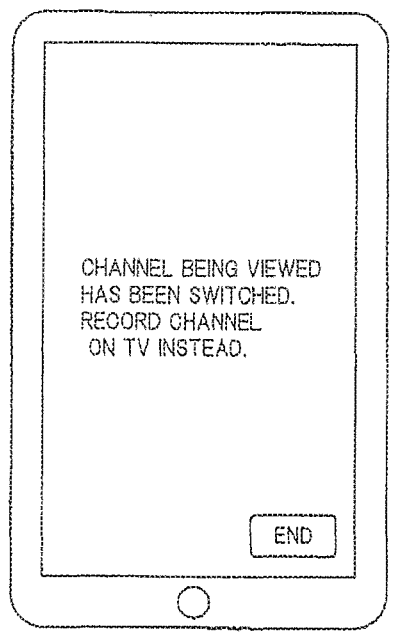
FIG. 13A illustrates an example of display on a screen of the terminal apparatus according to the third embodiment.

When the channel switching notification has been received, the terminal apparatus 1 displays, on a display unit 22, the start of recording of the video on the channel, which the user has viewed on the video display apparatus 3 so far, into the memory unit 35 of the video display apparatus 3 (step S812), and repeats the process from step S803. FIG. 13A illustrates an example of display on a screen of the terminal apparatus 1.

The channel switching notification is transmitted from the video display apparatus 3. When channel switching by a terminal apparatus 1 other than the terminal apparatus 1, which has powered on the video display apparatus 3, has occurred, for example, the video display apparatus 3 transmits the channel switching notification as status information.

When the terminal apparatus 1 has not received the channel switching notification, it repeats the process from step S803.

Figure 9:
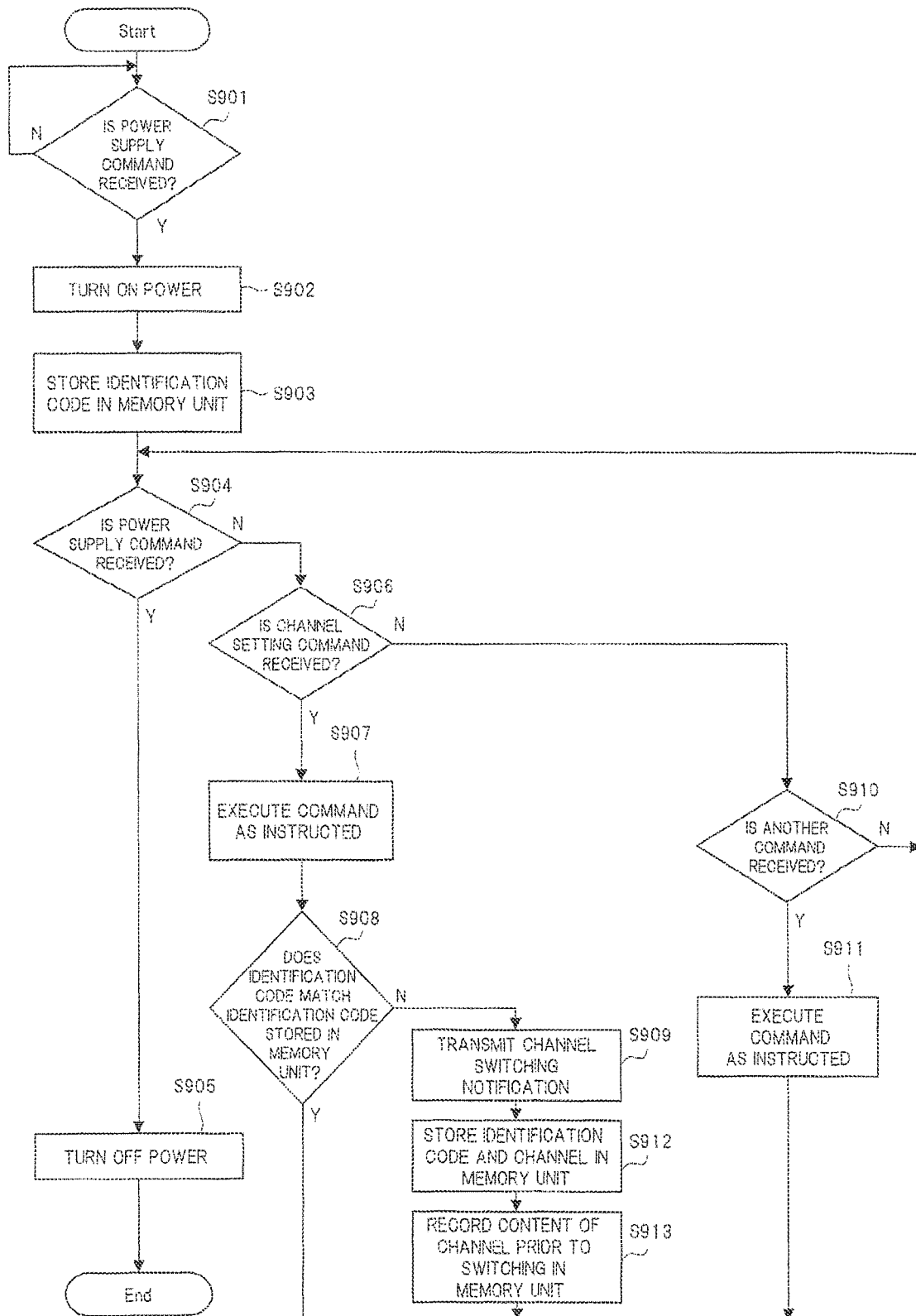
FIG. 9 is a flowchart illustrating a process of a video display apparatus according to the third embodiment.

FIG. 9 is a flowchart illustrating a process of the video display apparatus according to the third embodiment of the present invention. This flowchart illustrates the process performed when the video display apparatus 3 is remotely controlled by the terminal apparatus 1.

Since steps S901 to S907 are similar to steps S601 to S607 illustrated in FIG. 6, description thereof is omitted.

In step S908, the video display apparatus 3 confirms whether an identification code when a channel setting command has been received matches an identification code stored in the memory unit 35. When the identification codes match each other, the video display apparatus 3 repeats the process from step S904.

When the identification codes do not match each other, the video display apparatus 3 transmits a channel switching notification as status information to the terminal apparatus 1*a* corresponding to the identification code stored in the memory unit 35 (step S909). Next, in step S912, the video display apparatus 3 stores, in the memory unit 35, the identification code and channel when the channel setting command has been received. Here, it is assumed that an identification code of the terminal apparatus 1*b* has been received. Next, the video display apparatus 3 sets the channel prior to the switching to a television signal receiving unit 31, records the received video and audio to the memory unit 35 (step S913), and repeats the process from step S904.

The television signal receiving unit 31 can simultaneously receive a plurality of channels by setting the plurality of channels. When the channel stored in the memory unit 35 is set in the television signal receiving unit 31, the channel setting displayed on the display unit 32 is left as it is.

Since steps S910 to S911 are similar to steps S610 to S611 illustrated in FIG. 6, description thereof is omitted.

When the terminal apparatus 1*a* powers on the video display apparatus 3 by remote control in this manner, the video display apparatus 3 is powered on.

Next, when the terminal apparatus 1*a* performs channel switching of the video display apparatus 3 by remote control, a channel of the video display apparatus 3 is switched as instructed. When another terminal apparatus 1*b* performs channel switching of the video display apparatus 3 by remote control, the channel of the video display apparatus 3 is switched as instructed, and a channel switching notification is transmitted as status information to the terminal apparatus 1*a*.

Furthermore, the video display apparatus 3 records the content of the channel prior to the switching by the terminal apparatus 1*b* in the recording unit 35.

Figure 13B:
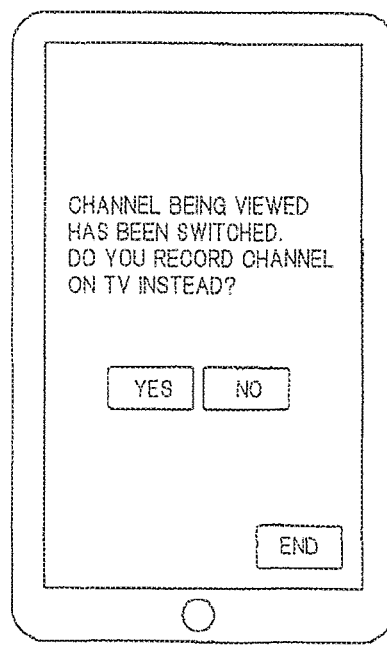
FIG. 13B illustrates an example of display on a screen of the terminal apparatus according to the third embodiment.

Note that it is also possible to ask the user whether the start of the recording of the content is permitted before the recording of the content is started. FIG. 13B illustrates an example of display on a screen of the terminal apparatus 1 at this time. Alternatively, it is also possible to ask the user whether the recording may be continued after it is started.

By the foregoing configuration, in the third embodiment of the present invention, a similar effect to that in the first embodiment can be obtained.

Furthermore, when the channel of the video display apparatus set by remote control from a terminal apparatus is switched by another terminal apparatus, a content displayed on the video display apparatus prior to the switching is recorded in the video display apparatus. Even if the channel set by a user is switched by another user, the content can be recorded in the video display apparatus without any particular operation by the user. Thus, it is possible to prevent the content from being missed.

Fourth Embodiment

Figure 10:
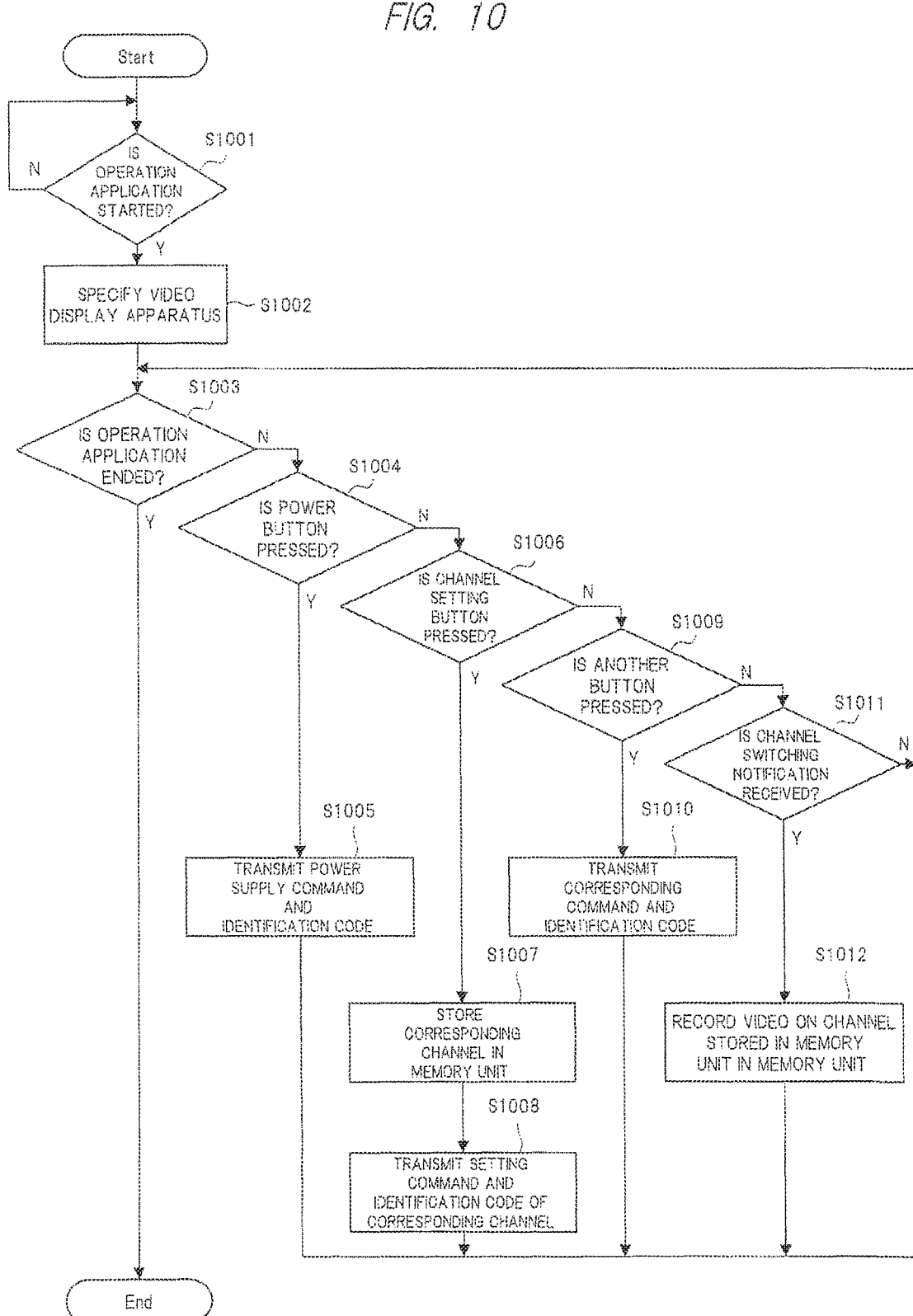
FIG. 10 is a flowchart illustrating a process of a video display apparatus according to the fourth embodiment.

FIG. 10 is a flowchart illustrating an operation of a terminal apparatus according to the fourth embodiment of the present invention. This flowchart illustrates a process performed when the terminal apparatus 1 remotely controls a video display apparatus 3.

Since steps S1001 to S1010 are similar to steps S401 to S410 illustrated in FIG. 4, description thereof is omitted.

In step S1011, the terminal apparatus 1 confirms whether a channel switching notification has been received.

When the channel switching notification has been received, the terminal apparatus 1 sets the channel stored in the memory unit 25 to the television signal receiving unit 21, and records a received content in the memory unit 25 (step S1012), and repeats the process from step S1003.

The channel switching notification is transmitted from the video display apparatus 3. For example, when channel switching by a terminal apparatus 1 other than the terminal apparatus 1, which has powered on the video display apparatus 3, has occurred, the video display apparatus 3 transmits the channel switching notification as status information.

When the channel switching notification has not been received, the terminal apparatus 1 repeats the process from step S1003.

When a terminal apparatus 1*a* powers on the video display apparatus 3 by remote control in this manner, the video display apparatus 3 is powered on.

Next, when the terminal apparatus 1*a* performs channel switching of the video display apparatus 3 by remote control, the channel of the video display apparatus 3 is switched as instructed. When another terminal apparatus 1*b* performs channel switching of the video display apparatus 3 by remote control, the channel of the video display apparatus 3 is switched as instructed, and the channel switching notification is transmitted as status information to the terminal apparatus 1*a*.

The terminal apparatus 1*a* records a content of the channel prior to the switching by the terminal apparatus 1*b* in the memory unit 25.

Note that it is also possible to ask the user whether the start of the recording of the content is permitted before the recording is started. Alternatively, it is also possible to ask the user whether the recording may be continued after the recording is started.

By the foregoing configuration, in the fourth embodiment of the present invention, a similar effect to that in the first embodiment can be obtained.

Furthermore, when the channel of the video display apparatus set by remote control from a terminal apparatus is switched by another terminal apparatus, the content displayed on the video display apparatus prior to the switching is recorded in the terminal apparatus. Even if the channel set by a user is switched by another user, the content can be recorded in the terminal apparatus without any particular operation by the user. Thus, it is possible to prevent the content from being missed.

Fifth Embodiment

Figure 11:
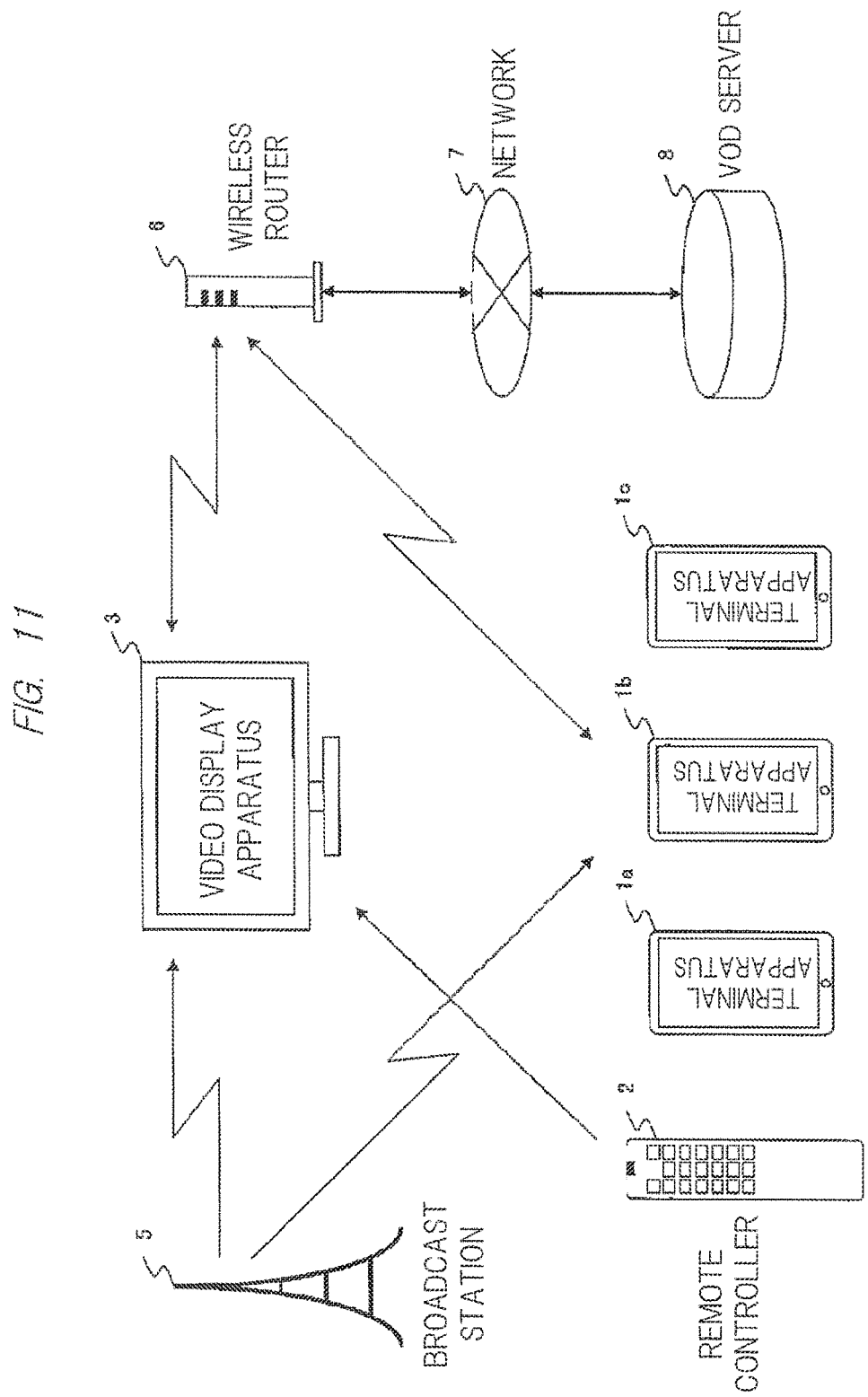
FIG. 11 is a diagram illustrating a configuration of a video display system according to the fifth embodiment.

FIG. 11 is a diagram illustrating a configuration of a video display system according to the fifth embodiment of the present invention. The video display system according to the present embodiment includes a plurality of terminal apparatuses 1 and a video display apparatus 3.

Since the terminal apparatuses 1, a remote controller 2, the video display apparatus 3, a broadcast station 5, a wireless router 6, and a network 7 are similar to those illustrated in FIG. 1, description thereof is omitted.

A VOD (Video On Demand) server 8 stores the same content as the content broadcasted from the broadcast station 5, and delivers the stored content to the terminal apparatus 1 and the video display apparatus 3 through the network 7.

Figure 12:
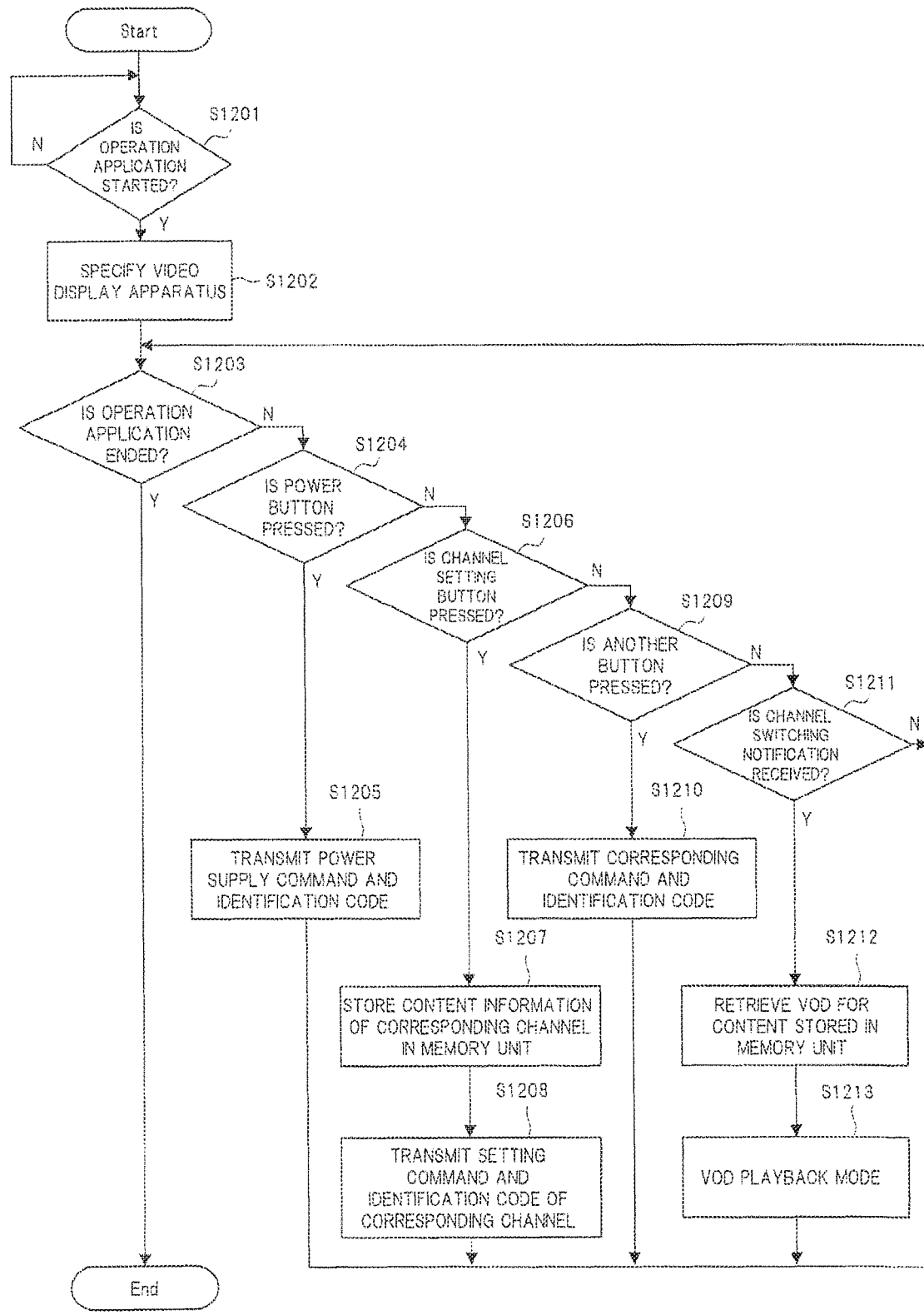
FIG. 12 is a flowchart illustrating a process of a terminal apparatus according to the fifth embodiment.

FIG. 12 is a flowchart illustrating an operation of the terminal apparatus according to the fifth embodiment of the present invention. This flowchart illustrates the process performed when the terminal apparatus 1 remotely controls the video display apparatus 3.

Since steps S1201 to S1206 are similar to steps S401 to S406 illustrated in FIG. 4, description thereof is omitted.

In step S1207, the terminal apparatus 1 stores content information of a corresponding channel in the memory unit 25.

Since steps S1208 to S1210 are similar to steps S408 to S410 illustrated in FIG. 4, description thereof is omitted.

In step S1211, the terminal apparatus 1 confirms whether a channel switching notification has been received as status information.

When the channel switching notification has been received, the terminal apparatus 1 retrieves the VOD server 8 for a content based on content information stored in the memory unit 25 (step S1212).

Figure 13C:
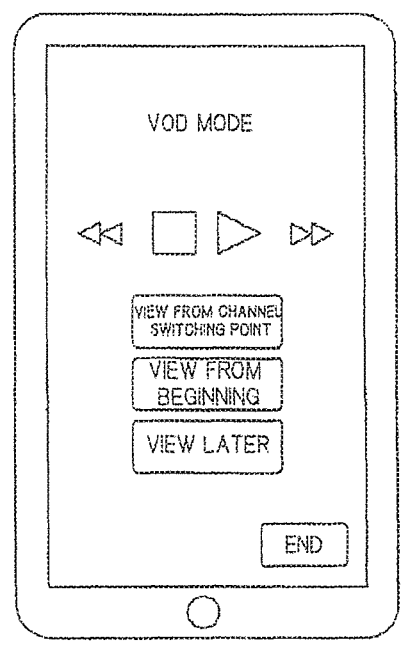
FIG. 13C illustrates an example of display on a screen of the terminal apparatus according to the fifth embodiment.

Next, in step S1213, the terminal apparatus 1 enters a VOD playback mode, and repeats the process from step S1203 when the VOD playback mode ends. FIG. 13C illustrates an example of display on an operation screen of the terminal apparatus 1 in the VOD playback mode. In addition to playback, fast-forward and rewind, a user can view the content from the point where the channel has been switched if the time when the channel has been switched is stored. Alternatively, the content can be viewed from the beginning or can also be viewed later.

The channel switching notification is transmitted from the video display apparatus 3. For example, when channel switching by a terminal apparatus 1 other than the terminal apparatus 1 which has switched the channel of the video display apparatus 3 has occurred, the video display apparatus 3 transmits the channel switching notification as status information.

When the channel switching notification has not been received, the terminal apparatus 1 repeats the process from step S1203.

When a terminal apparatus 1*a* powers on the video display apparatus 3 by remote control in this manner, the video display apparatus 3 is powered on.

Next, when the terminal apparatus 1*a* performs channel switching of the video display apparatus 3 by remote control, the channel of the video display apparatus 3 is switched as instructed. When another terminal apparatus 1*b* then performs channel switching of the video display apparatus 3 by remote control, the channel of the video display apparatus 3 is switched as instructed, and the channel switching notification is transmitted as status information to the terminal apparatus 1*a*.

When the channel switching notification is received, the terminal apparatus 1*a* retrieves the VOD for a content of the channel prior to the switching by the terminal apparatus 1*b*.

Figure 13D:
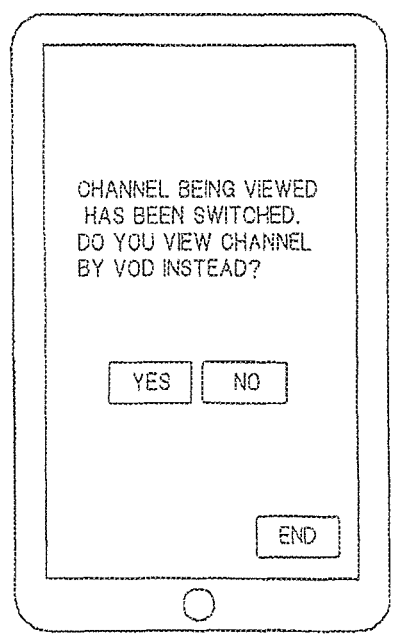
FIG. 13D illustrates an example of display on a screen of the terminal apparatus according to the fifth embodiment.

Note that it is also possible to ask the user whether the start of the retrieval for the content is permitted before the retrieval is started. FIG. 13D illustrates an example of display on a screen of the terminal apparatus 1 at this time. For example, only when a "YES" button displayed on the screen is pressed, the terminal apparatus 1 may enter the VOD playback mode.

By the foregoing configuration, in the fourth embodiment of the present invention, a similar effect to that in the first embodiment can be obtained.

Furthermore, when the channel of the video display apparatus set by remote control from a terminal apparatus is switched by another terminal apparatus, a content displayed on the video display apparatus prior to the switching can be retrieved from the VOD and displayed on the terminal apparatus. Even if the channel set by a user is switched by another user, the user can retrieve the VOD without any particular operation and can view the channel by using the terminal apparatus at hand. Thus, it is possible to prevent the content from being missed.

Sixth Embodiment

Figure 14:
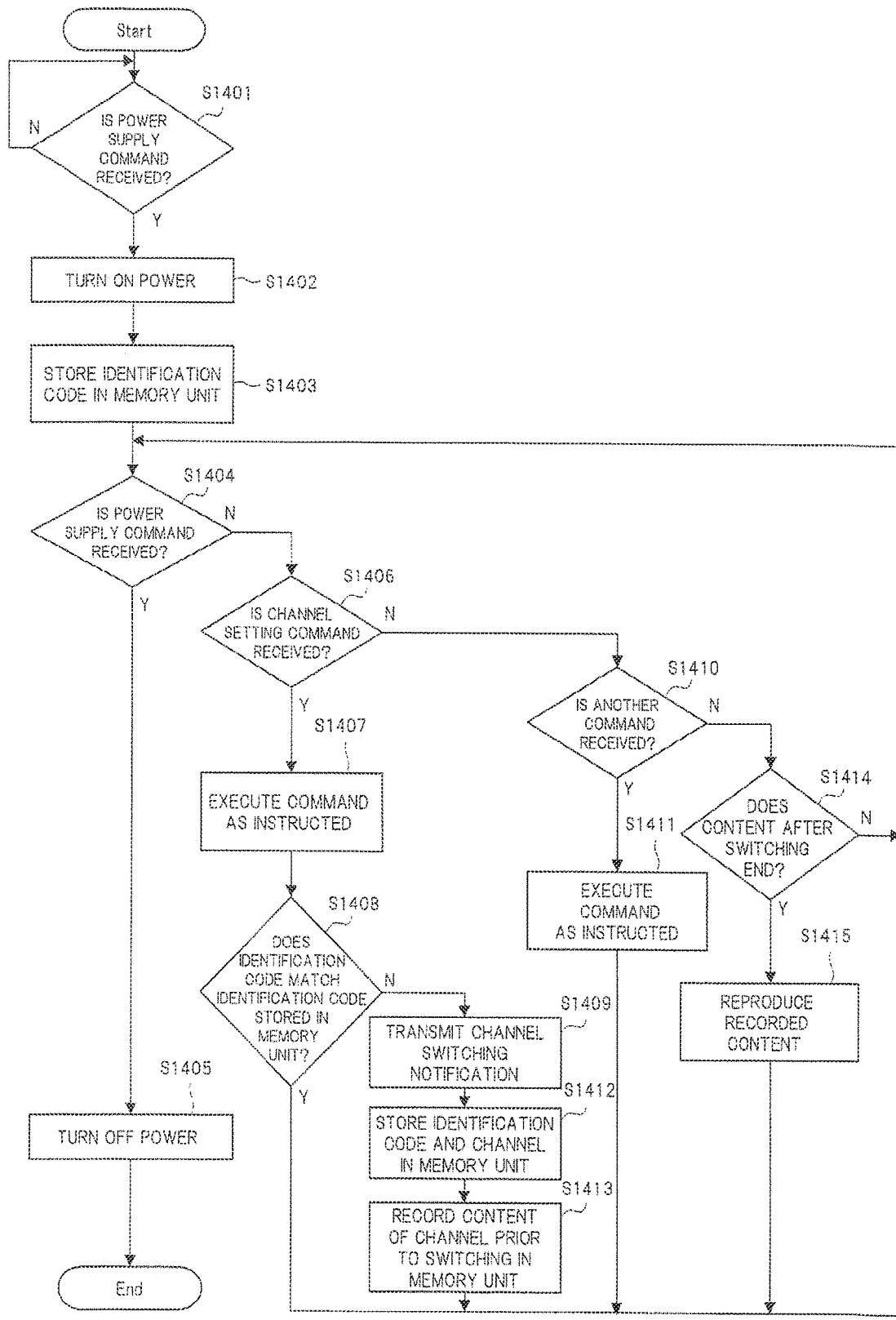
FIG. 14 is a flowchart illustrating a process of a video display apparatus according to the sixth embodiment.

FIG. 14 is a flowchart illustrating a process of a video display apparatus according to the sixth embodiment of the present invention. This flowchart illustrates the process performed when the video display apparatus 3 is remotely controlled by a terminal apparatus 1.

Since steps S1401 to S1407 are similar to steps S601 to S607 illustrated in FIG. 6, description thereof is omitted.

Since steps S1408 to S1409 are similar to steps S908 to S909 illustrated in FIG. 9, description thereof is omitted.

Since steps S1412 to S1413 are similar to steps S912 to S913 illustrated in FIG. 9, description thereof is omitted.

In step S1410, it is confirmed whether another command has been received. When the other command has been received, the process proceeds to step S1411. When the other command has not been received, the process proceeds to step S1414. Since step S1411 is similar to step S611 illustrated in FIG. 6, description thereof is omitted.

In step S1414, it is confirmed whether a content after channel switching has ended. When the content after the channel switching has ended, the process proceeds to step S1415, and the video display apparatus 3 reproduces a recorded content. When the content after the channel switching has not ended, the video display apparatus 3 repeats the process from step S1404.

When the terminal apparatus 1*a* powers on the video display apparatus 3 by remote control in this manner, the video display apparatus 3 is powered on.

Next, when the terminal apparatus 1*a* performs channel switching of the video display apparatus 3 by remote control, the channel of the video display apparatus 3 is switched as instructed. When another terminal apparatus 1*b* performs channel switching of the video display apparatus 3 by remote control, the channel of the video display apparatus 3 is switched as instructed, and a channel switching notification is transmitted as status information to the terminal apparatus 1*a*.

Furthermore, the video display apparatus 3 records a content of the channel prior to the switching by the terminal apparatus 1*b* in the memory unit 35, and reproduces the content when the content of the channel after the switching ends.

By the foregoing configuration, in the sixth embodiment of the present invention, a similar effect to that in the first embodiment can be obtained.

Furthermore, when the channel of the video display apparatus set by remote control from a terminal apparatus is switched by another terminal apparatus, the content displayed on the video display apparatus prior to the switching is recorded in the video display apparatus, and the content is reproduced when the content of the channel after the switching ends. Even if a channel set by a user is switched by another user, the content is recorded and reproduced by the video display apparatus without any particular operation by the user. Thus, it is possible to prevent the content from being missed.

Seventh Embodiment

Figure 15:
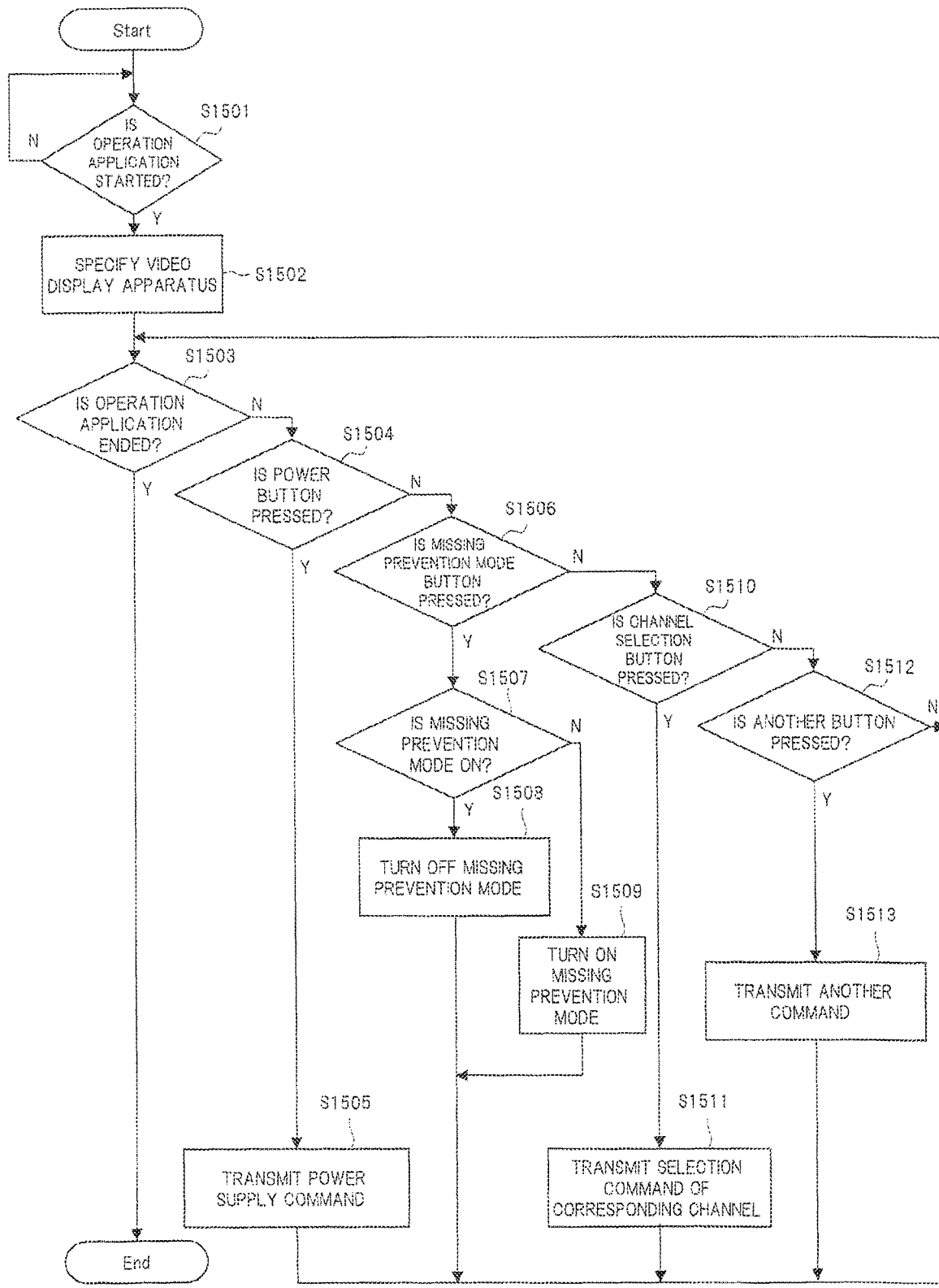
FIG. 15 is a flowchart illustrating a process of a terminal apparatus according to the seventh embodiment.

FIG. 15 is a flowchart illustrating an operation of a terminal apparatus 1 when the terminal apparatus 1 remotely controls a video display apparatus 3.

In step S1501, the terminal apparatus 1 waits until application software for performing the remote control of the video display apparatus 3 (hereinafter referred to as "operation application") is started based on an operation by the user.

FIGS. 5A-5D and FIG. 23 illustrate an example of various types of display on the touch-panel display unit 22 in the terminal apparatus 1. FIG. 5A illustrates a menu screen on which various types of application software are arranged in the terminal apparatus 1. When the user presses, for example, a "television" button displayed on the touch panel, the operation application is started.

In step S1502, the terminal apparatus 1 selects the video display apparatus 3 serving as a target of the remote control based on the operation by the user. FIG. 5B illustrates an example of display on a selection screen in the case where there are two video display apparatuses 3 that can be selected as a target of the remote control. Here, it is assumed that a "television A" is selected.

Figure 23:
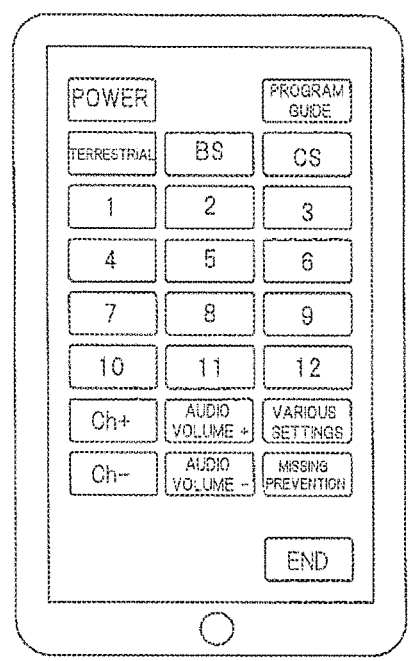
FIG. 23 illustrates an example of display on a screen of the terminal apparatus according to the seventh embodiment.

When the video display apparatus 3 serving as a target of the remote control is selected, the terminal apparatus 1 displays various types of instructions that can be transmitted to the video display apparatus 3. FIG. 23 illustrates an example of display on an operation screen of the video display apparatus 3 in that case.

Next, in step S1503, the terminal apparatus 1 confirms whether the user has performed an operation for ending the operation application. When the user has performed the operation for ending the operation application, for example, the operation of pressing an "end" button displayed on the terminal apparatus 1, the terminal apparatus 1 returns to a process for displaying a menu screen.

In step S1504, the terminal apparatus 1 confirms whether the user has pressed a "power" button. When the user has pressed the "power" button displayed on the terminal apparatus 1, the terminal apparatus 1 transmits a power supply command to the video display apparatus 3 (step S1505), and repeats the process from step S1503.

When the user has not pressed the "power" button displayed on the terminal apparatus 1, the terminal apparatus 1 confirms whether the user has pressed a "missing prevention" mode button in step S1506. When the user has pressed the "missing prevention" mode button displayed on the terminal apparatus 1, the terminal apparatus 1 switches ON and OFF of a missing prevention mode (step S1507). When the missing prevention mode is ON, the terminal apparatus 1 turns off the missing prevention mode in step S1508, and when the missing prevention mode is OFF, the terminal apparatus 1 turns on the missing prevention mode in step S1509. Then, the process from step S1503 is repeated.

The missing prevention mode is for preventing a television program on an original channel from being missed after the end of a video of advertisement means accompanying the television program such as CM (Commercial Message, hereinafter referred to as "commercial") or announcement means such as an announcement of a program. More specifically, even if the user switches the channel after the start of the video of the advertisement means or the announcement means, the channel is switched to the original channel at the timing of the end of the video. Thus, for example, even if the user is viewing a television program on a channel A and switches the channel A to a channel B or a channel C after the television program is switched to a commercial, the display on the video display apparatus 3 is switched to the channel A at the timing at which the commercial on the channel A ends and is switched to the television program.

When the user has not pressed the "missing prevention" mode button displayed on the terminal apparatus 1, the terminal apparatus 1 confirms whether the user has pressed a channel selection button of a remote control function in step S1510. When the user has pressed a channel selection button such as a "1" button or a "2" button displayed on the terminal apparatus 1, the process proceeds to step S1511, and a selection command of a corresponding channel is transmitted to the video display apparatus 3 and the process from step S1503 is repeated.

When the user has not pressed the channel selection button displayed on the terminal apparatus 1, the terminal apparatus 1 confirms whether the user has pressed the other button in step S1512. Examples of other setting changes include switching of an audio volume.

When the user has issued an instruction to change setting of the video display apparatus 3, the terminal apparatus 1 transmits a corresponding setting command to the video display apparatus 3 (step S1513), and the process from step S1503 is repeated.

Figure 16:
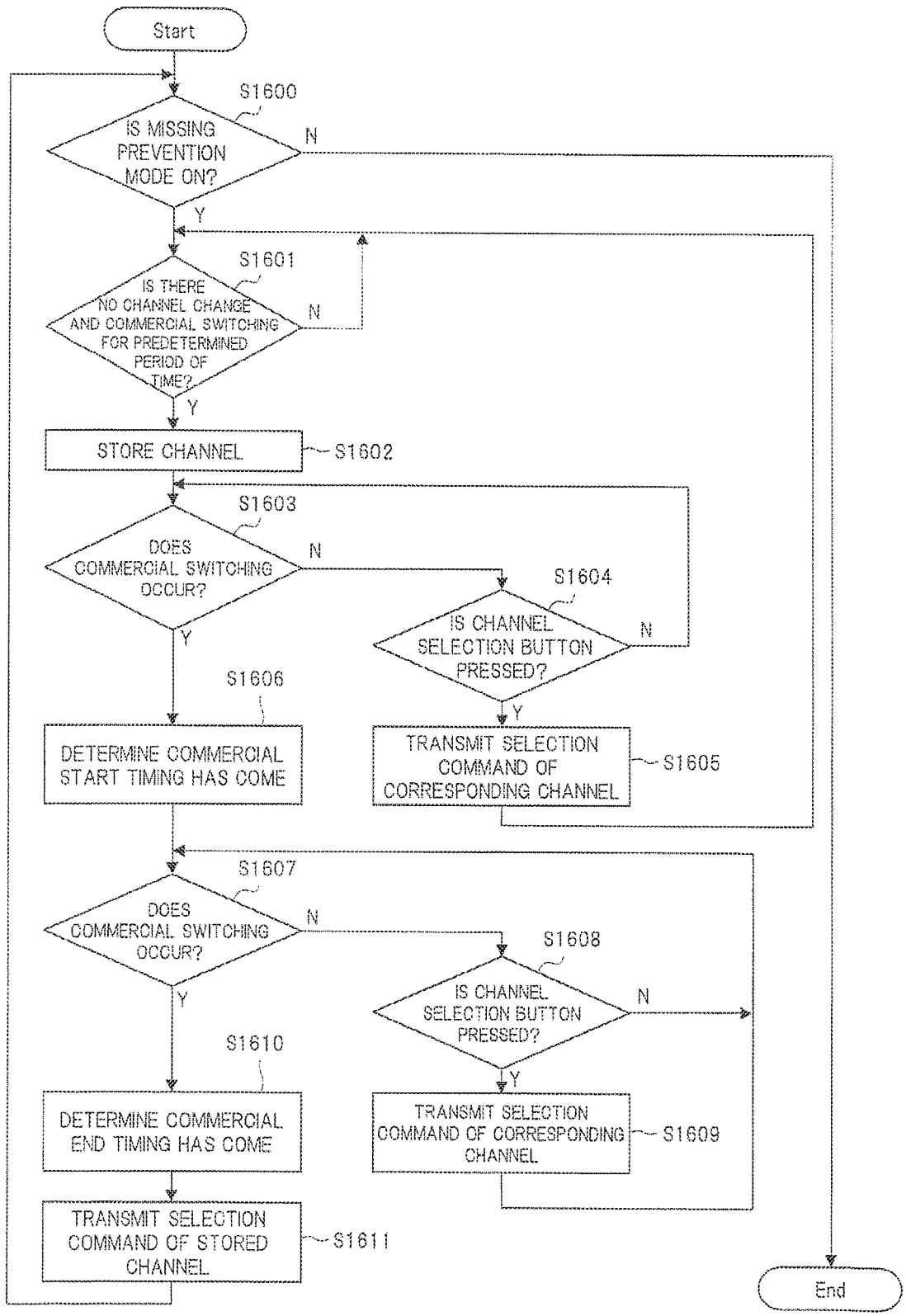
FIG. 16 is a flowchart illustrating a missing prevention process of the terminal apparatus according to the seventh embodiment.

FIG. 16 is a flowchart illustrating a missing prevention process of the terminal apparatus 1.

When the missing prevention mode of the terminal apparatus 1 is ON in step S1600, the process proceeds to step S1601, and when the missing prevention mode is OFF, the process ends.

In step S1601, the terminal apparatus 1 waits for an elapse of a predetermined period of time, e.g., five minutes during which the user does not change a channel and there is no commercial switching, and the terminal apparatus 1 stores the channel in the memory unit 25 in step S1602. The commercial switching mentioned here means switching from a television program to a commercial and switching from a commercial to a television program. Generally, there is a point in which an audio is silent between a television program and a commercial, and the timing at which the commercial switching occurs can be detected when a television signal is received by a television signal receiving unit 21 and a scene change where an audio is silent is detected.

Next, in step S1603, the terminal apparatus 1 receives a television signal of the channel stored in the memory unit 25 by using the television signal receiving unit 21, and waits for the occurrence of the commercial switching. When the user has pressed a channel selection button of a remote control function while waiting for the occurrence of the commercial switching (step S1604), the terminal apparatus 1 transmits a selection command of a corresponding channel to the video display apparatus 3 (step S1605), and repeats the process from step S1601.

Through steps S1601 to S1605, the terminal apparatus 1 detects the commercial switching after an elapse of a predetermined period of time without the channel change by the user, and determines that a commercial start timing has come (step S1606).

Next, in step S1607, the terminal apparatus 1 receives the television signal of the channel stored in the memory unit 25 by the television signal receiving unit 21, and waits for the occurrence of the commercial switching. When the user has pressed the channel selection button of a remote control function while waiting for the occurrence of the commercial switching (step S1608), the terminal apparatus 1 transmits a selection command of a corresponding channel to the video display apparatus 3 (step S1609).

Also when the channel of the video display apparatus 3 is switched in step S1609, the terminal apparatus 1 waits for the occurrence of the commercial switching of the channel stored in the memory unit 25 in step S1607.

Through steps S1607 to S1609, the terminal apparatus 1 detects the commercial switching after the start of the commercial, and determines that a commercial end timing has come (step S1610).

Next, in step S1611, the terminal apparatus 1 transmits the selection command of the channel stored in the memory unit 25 to the video display apparatus 3, and repeats the process from step S1600. When the channel selection button of a remote control function has not been pressed in step S1608, the terminal apparatus 1 does not have to transmit the selection command of the channel stored in the memory unit 25 to the video display apparatus 3.

Figure 17:
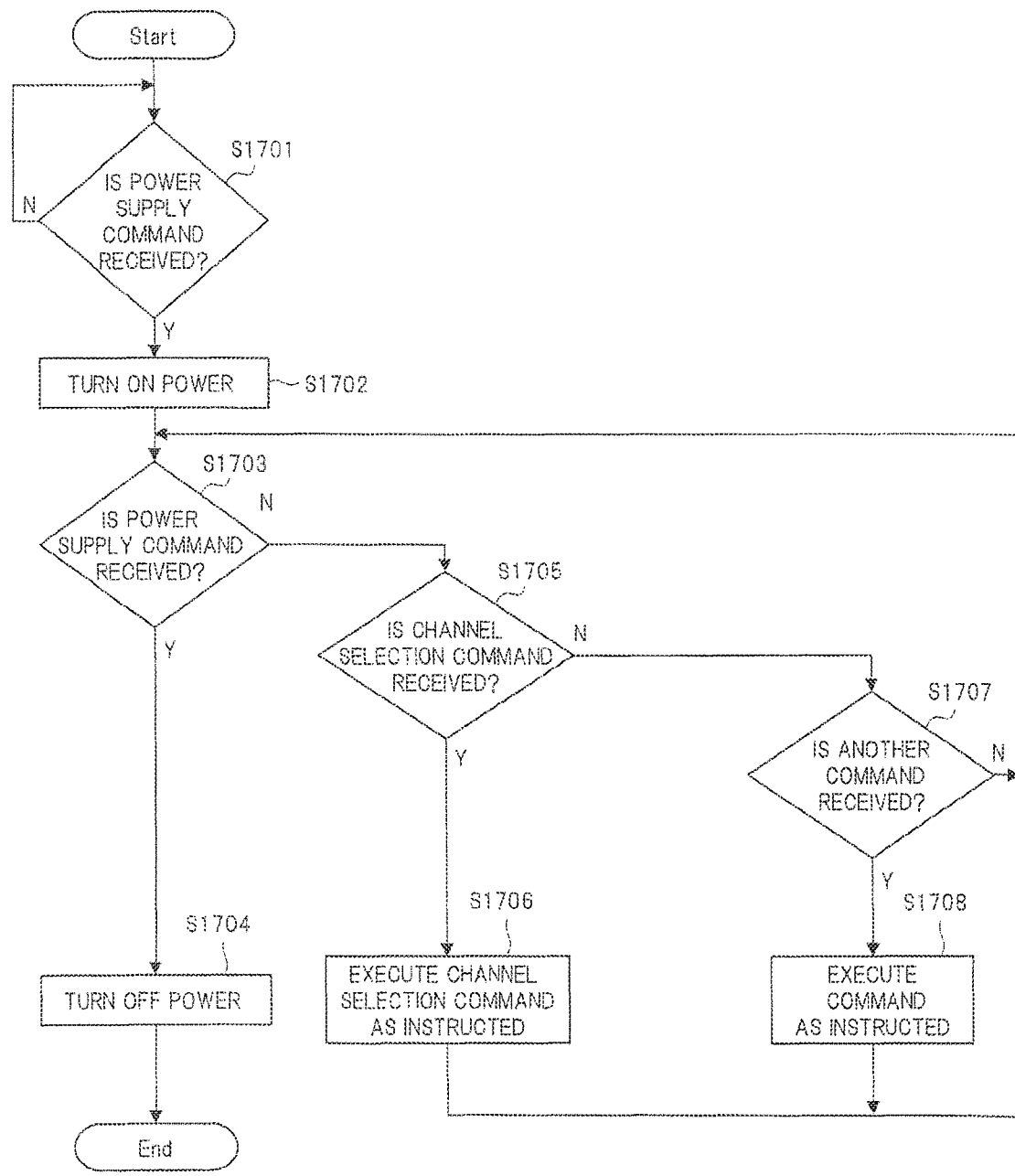
FIG. 17 is a flowchart illustrating a process of a video display apparatus according to the seventh embodiment.

FIG. 17 is a flowchart illustrating an operation of the video display apparatus 3.

In step S1701, the video display apparatus 3 waits for receiving of a power supply command. When the power supply command has been received, the video display apparatus 3 is powered on (step S1702).

Next, in step S1703, it is confirmed whether the video display apparatus 3 has received the power supply command again. When the power supply command has been received, the video display apparatus 3 is powered off (step S1704). When the power supply command has not been received, the video display apparatus 3 confirms whether a channel selection command has been received in step S1705. When the channel selection command has been received, the video display apparatus 3 executes the channel selection command as instructed (step S1706), and repeats the process from step S1703.

When the channel selection command has not been received, the video display apparatus 3 confirms whether another command has been received in step S1707. When the other command has been received, the video display apparatus 3 executes the command as instructed (step S1708), and repeats the process from step S1703.

By the foregoing configuration, in the seventh embodiment of the present invention, the terminal apparatus 1 stores the channel when the user does not change a channel for a predetermined period of time, and transmits a selection command of the channel to the video display apparatus 3 in response to a commercial end timing.

Even if the user switches a channel during a commercial, the channel returns to the channel prior to the switching when the commercial ends. Thus, it is possible to prevent a television program on the channel, which has been being viewed by the user, from being missed.

Instead of the terminal apparatus 1, the video display apparatus 3 may store the channel when the channel is not changed for a predetermined period of time, and the video display apparatus 3 itself may detect a commercial end timing and switch the channel to a corresponding channel.

Alternatively, instead of the configuration in which the terminal apparatus 1 or the video display apparatus 3 switches the channel in response to the commercial end timing, the user may be notified of the end of the commercial by a video or an audio, and the user himself/herself may operate the terminal apparatus 1 to switch the channel.

Eighth Embodiment

Next, the eighth embodiment of the present invention will be described below. A configuration, an effect, and the like in the present embodiment are similar to those in the seventh embodiment unless otherwise noted. Thus, a difference between the present embodiment and the seventh embodiment will be mainly described below, and description of common points is omitted as much as possible in order to avoid an overlap of the description.

Figure 18:
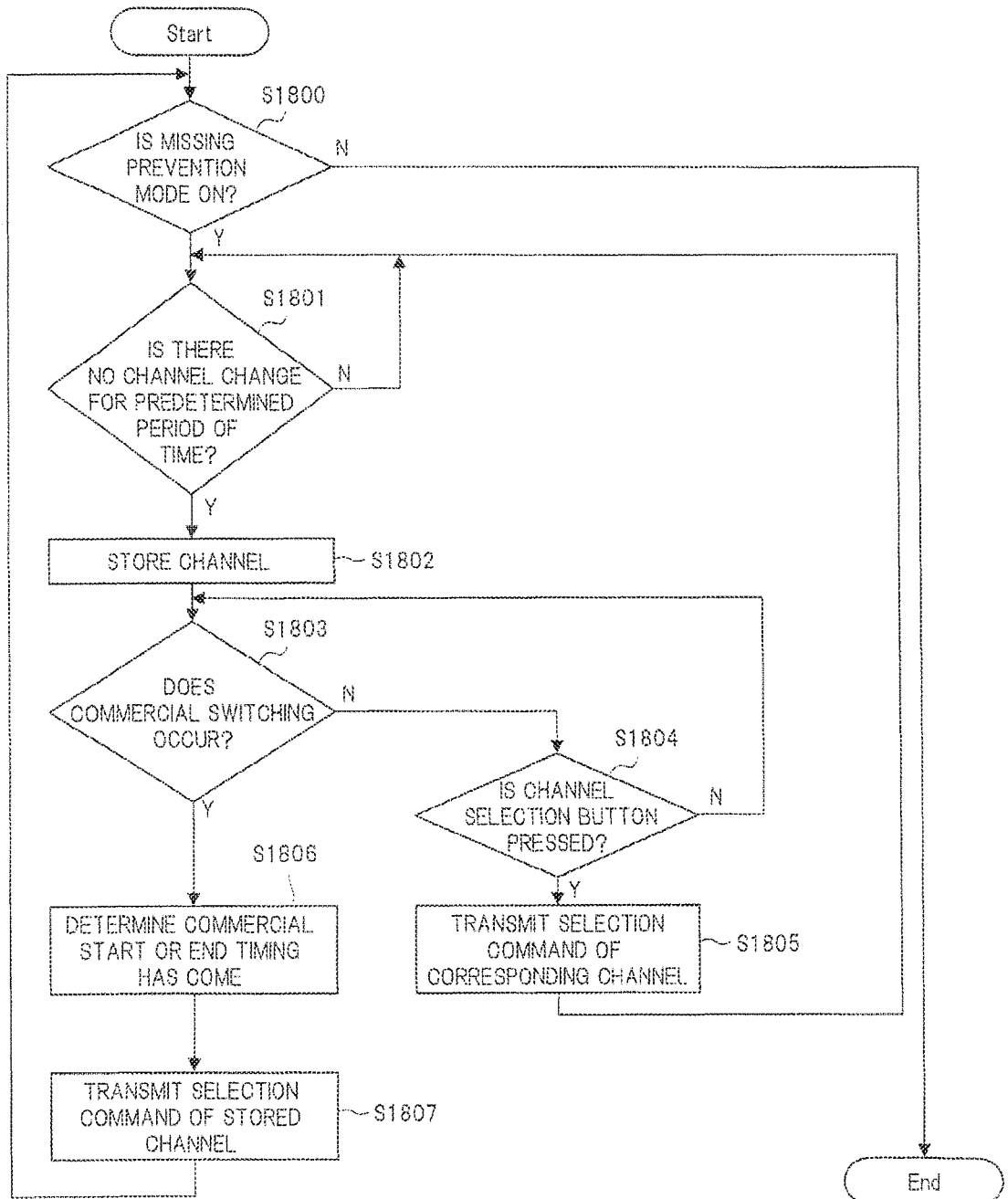
FIG. 18 is a flowchart illustrating a missing prevention process of a terminal apparatus according to the eighth embodiment.

FIG. 18 is a flowchart illustrating a missing prevention process of the terminal apparatus 1.

When a missing prevention mode of the terminal apparatus 1 is ON in step S1800, the process proceeds to step S1801, and when the missing prevention mode is OFF, the process ends.

When a user has not changed a channel for a predetermined period of time, e.g., five minutes in step S1801, the terminal apparatus 1 stores the channel in the memory unit 25 in step S1802.

Next, in step S1803, the terminal apparatus 1 receives a television signal of the channel stored in the memory unit 25 by a television signal receiving unit 21, and waits for the occurrence of commercial switching. When the user has pressed a channel selection button of a remote control function while the terminal apparatus 1 waits for the occurrence of the commercial switching (step S1804), the terminal apparatus 1 transmits a selection command of a corresponding channel to the video display apparatus 3 (step S1805), and repeats the process from step S1801.

Through steps S1801 to S1805, the terminal apparatus 1 detects the commercial switching after an elapse of a predetermined period of time without the channel change by the user, and determines that a commercial start or end timing has come (step S1806).

Next, in step S1807, the terminal apparatus 1 transmits the selection command of the channel stored in the memory unit 25 to the video display apparatus 3, and repeats the process from step S1800.

By the foregoing configuration, in the eighth embodiment of the present invention, a similar effect to that in the seventh embodiment can be obtained.

Furthermore, since the terminal apparatus 1 stores the channel when the user does not change the channel for a predetermined period of time, and transmits a selection command of the channel to the video display apparatus 3 at the timing of start and end of the commercial, it is not necessary to distinguish the start and the end of the commercial, and the missing prevention process can be simplified.

Instead of the terminal apparatus 1, the video display apparatus 3 may store the channel when the channel is not changed for a predetermined period of time, and the video display apparatus 3 itself may switch the channel to the corresponding channel at the timing of start or end of the commercial.

Alternatively, instead of the configuration in which the terminal apparatus 1 or the video display apparatus 3 switches the channel at the timing of start or end of the commercial, the user may be notified of the start or end of the commercial by a video or an audio, and the user himself/herself may operate the terminal apparatus 1 to switch the channel.

Ninth Embodiment

Next, the ninth embodiment of the present invention will be described below. A configuration, an effect, and the like in the present embodiment are also similar to those in the seventh embodiment unless otherwise noted. Thus, a difference between the present embodiment and the seventh embodiment will be mainly described below.

Figure 19:
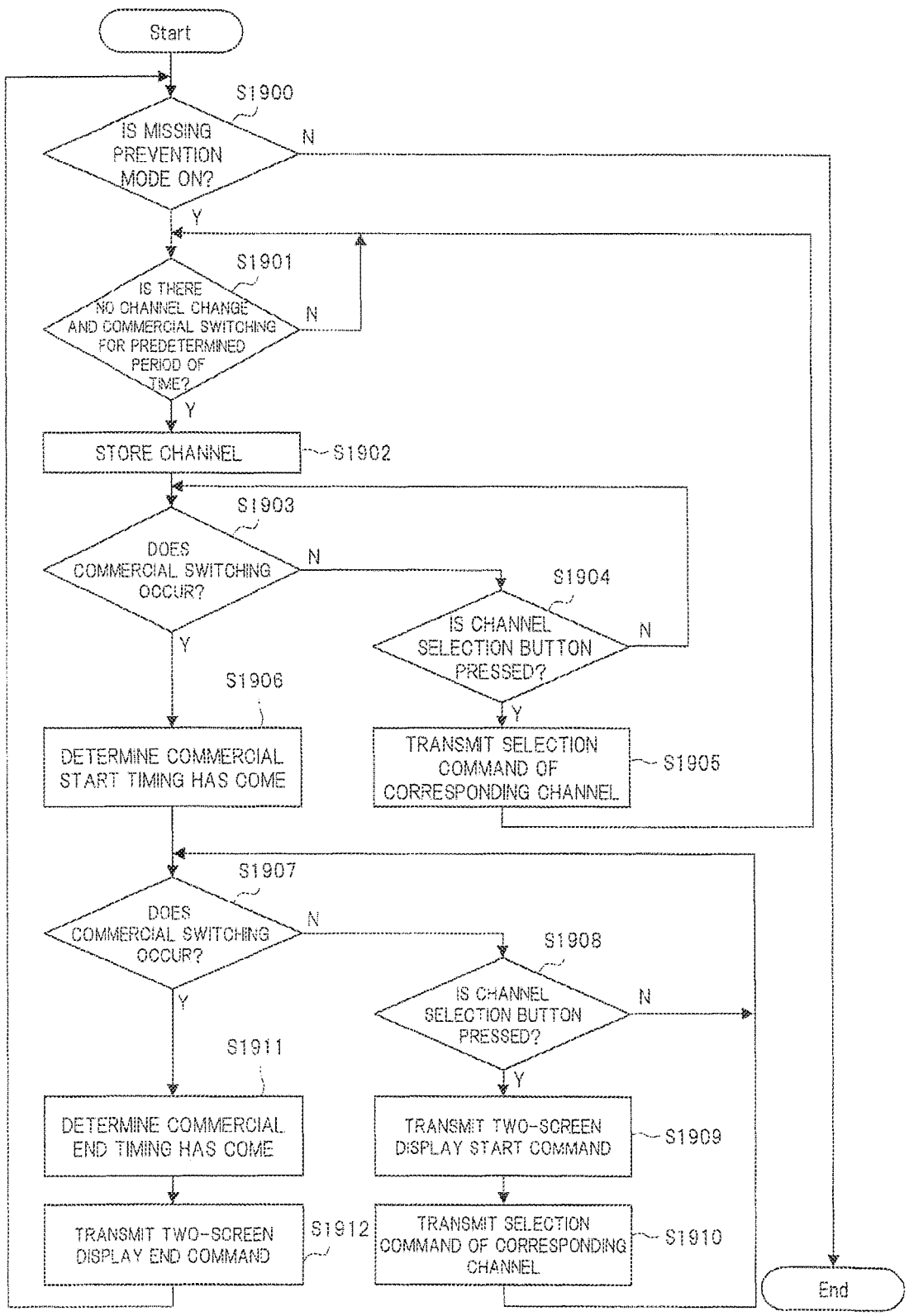
FIG. 19 is a flowchart illustrating a missing prevention process of a terminal apparatus according to the ninth embodiment.

FIG. 19 is a flowchart illustrating a missing prevention process of the terminal apparatus 1.

When a missing prevention mode of the terminal apparatus 1 is ON in step S1900, the process proceeds to step S1901, and when the missing prevention mode is OFF, the process ends.

Since steps S1901 to S1905 are similar to steps S1601 to S1605 illustrated in FIG. 16, description thereof is omitted. Through steps S1901 to S1905, the terminal apparatus 1 detects commercial switching after an elapse of a predetermined period of time without the channel change by the user, and determines that a commercial start timing has come (step S1906).

Next, in step S1907, the terminal apparatus 1 receives a television signal of the channel stored in the memory unit 25 by a television signal receiving unit 21, and waits for the occurrence of the commercial switching. When the user has pressed a channel selection button of a remote control function while the terminal apparatus 1 waits for the occurrence of the commercial switching (step S1908), the terminal apparatus 1 transmits a two-screen display start command to the video display apparatus 3 (step S1909), and transmits a selection command of a corresponding channel for an added screen to the video display apparatus 3 (step S1910). When the user has pressed the channel selection button of a remote control function again while the terminal apparatus 1 waits for the occurrence of the commercial switching, the terminal apparatus 1 does not have to transmit the two-screen display start command in step S1909.

Also when a channel of the video display apparatus 3 has been switched in step S1909, the terminal apparatus 1 waits for the occurrence of the commercial switching of the channel stored in the memory unit 25 in step S1907.

Through steps S1907 to S1910, the terminal apparatus 1 detects the commercial switching after the start of the commercial, and determines that a commercial end timing has come (step S1911).

Next, in step S1912, the terminal apparatus 1 transmits a two-screen display end command to the video display apparatus 3, and repeats the process from step S1900. The screen added later is erased when the two-screen display ends. The two-screen display end command does not have to be transmitted when the screen has not been switched to the two-screen display.

By the foregoing configuration, in the ninth embodiment of the present invention, a similar effect to that in the seventh embodiment can be obtained.

Furthermore, the terminal apparatus 1 stores the channel when the user does not change a channel for a predetermined period of time, and when the channel selection button is pressed during the commercial, the terminal apparatus 1 switches the video display apparatus 3 to the two-screen display and displays the channel on the added screen. Then, the terminal apparatus 1 ends the two-screen display in response to the timing of the end of the commercial.

Since the video on the original channel can be confirmed by the two-screen display even when the channel is switched, the user can switch the channel without worrying about missing a television program.

Instead of the terminal apparatus 1, the video display apparatus 3 may store the channel when the channel is not changed for a predetermined period of time, and the video display apparatus 3 itself may start and end the two-screen display.

Also, since the user can confirm both of the video on the original channel and the video on the channel after the switching by the two-screen display, the user himself/herself may operate the terminal apparatus 1 to end the two-screen display instead of the configuration in which the terminal apparatus lends the two-screen display in response to the timing of the end of the commercial.

Tenth Embodiment

Next, the tenth embodiment of the present invention will be described below. A configuration, an effect, and the like in the present embodiment are similar to those in the seventh embodiment unless otherwise noted. Thus, a difference between the present embodiment and the seventh embodiment will be mainly described below.

Figure 20:
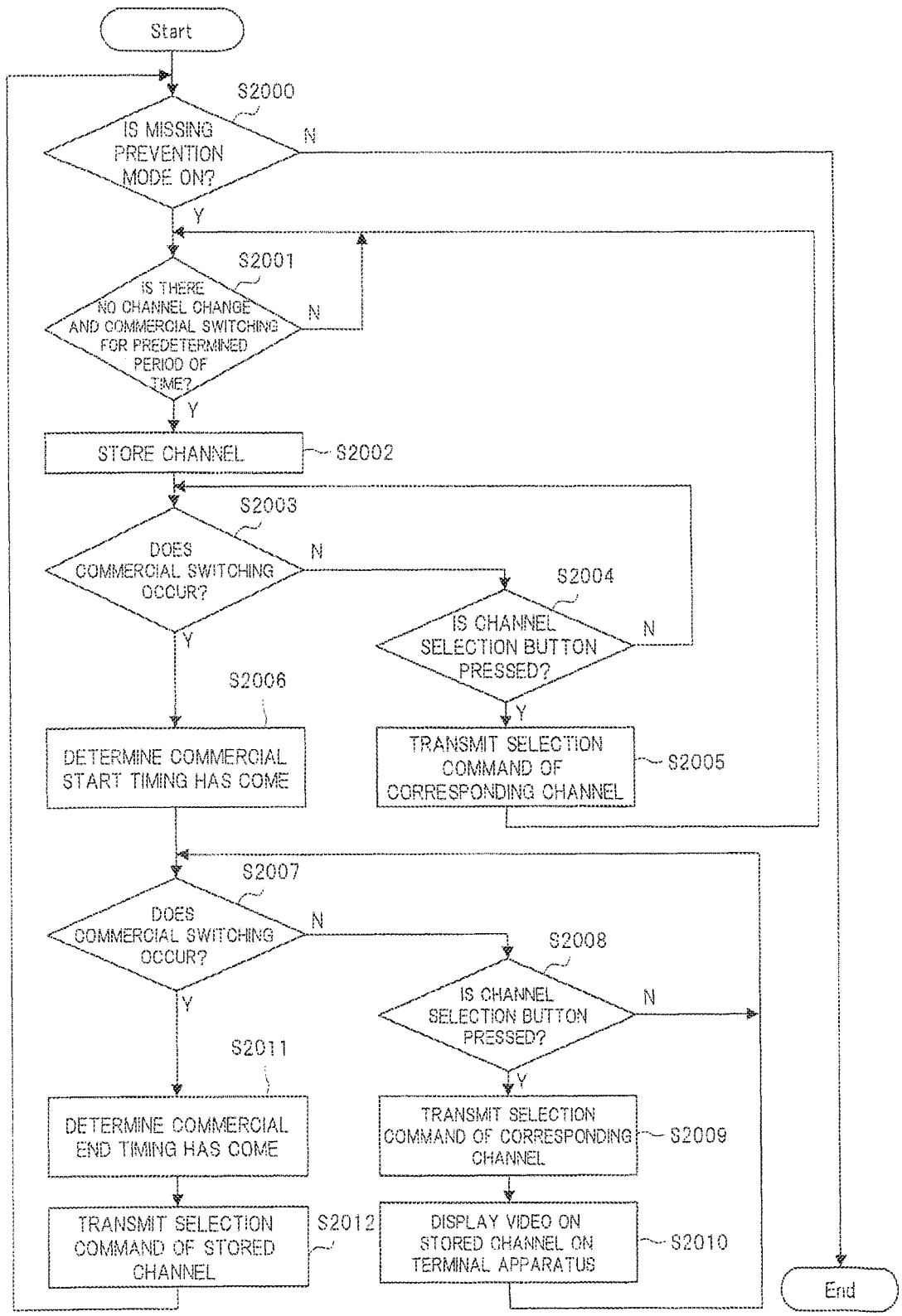
FIG. 20 is a flowchart illustrating a missing prevention process of a terminal apparatus according to the tenth embodiment.

FIG. 20 is a flowchart illustrating a missing prevention process of the terminal apparatus 1.

When a missing prevention mode of the terminal apparatus 1 is ON in step S2000, the process proceeds to step S2001, and when the missing prevention mode is OFF, the process ends.

Since steps S2001 to S2005 are similar to steps S1601 to S1605 illustrated in FIG. 16, description thereof is omitted. Through steps S2001 to S2005, the terminal apparatus 1 detects commercial switching after an elapse of a predetermined period of time without the channel change by the user, and determines that a commercial start timing has come (step S2006).

Next, in step S2007, the terminal apparatus 1 receives a television signal of the channel stored in the memory unit 25 by a television signal receiving unit 21, and waits for the occurrence of the commercial switching. When the user has pressed a channel selection button of a remote control function while the terminal apparatus 1 waits for the occurrence of the commercial switching (step S2008), the terminal apparatus 1 transmits a selection command of a corresponding channel to the video display apparatus 3 (step S2009), and displays a video on the channel stored in the memory unit 25 in the terminal apparatus 1 on the display unit 22 (step S2010).

Also when a channel of the video display apparatus 3 has been switched in step S2009, the terminal apparatus 1 waits for the occurrence of the commercial switching of the channel stored in the memory unit 25 in step S2007.

Through steps S2007 to S2010, the terminal apparatus 1 detects the commercial switching after determining the commercial start timing, and determines that a commercial end timing has come (step S2011).

Next, in step S2012, the terminal apparatus 1 transmits a selection command of the channel stored in the memory unit 25 to the video display apparatus 3, and repeats the process from step S2000.

By the foregoing configuration, in the tenth embodiment of the present invention, a similar effect to that in the seventh embodiment can be obtained.

Furthermore, the terminal apparatus 1 stores the channel when the user does not change a channel for a predetermined period of time, switches the channel of the video display apparatus 3 when a channel selection button is pressed during a commercial, and displays a video on the original channel on the screen of the terminal apparatus 1. Then, the terminal apparatus 1 returns the channel of the video display apparatus 3 to the original channel in response to the commercial end timing.

Since the video on the original channel can be confirmed by the terminal apparatus 1 even when the channel has been switched, the user can switch the channel without worrying about missing a television program.

The video display apparatus 3 as well as the terminal apparatus 1 may also store the channel when the channel is not changed for a predetermined period of time, and the video display apparatus 3 itself may detect the commercial end timing to switch the channel to a corresponding channel.

Also, since the user can confirm the video on the original channel by the terminal apparatus 1, the user himself/herself may operate the terminal apparatus 1 to end the two-screen display instead of the configuration in which the terminal apparatus 1 ends the two-screen display in response to the commercial end timing.

Eleventh Embodiment

Next, the eleventh embodiment of the present invention will be described below. A configuration, an effect, and the like in the present embodiment are similar to those in the seventh embodiment unless otherwise noted. Thus, a difference between the present embodiment and the seventh embodiment will be mainly described below.

Figure 21:
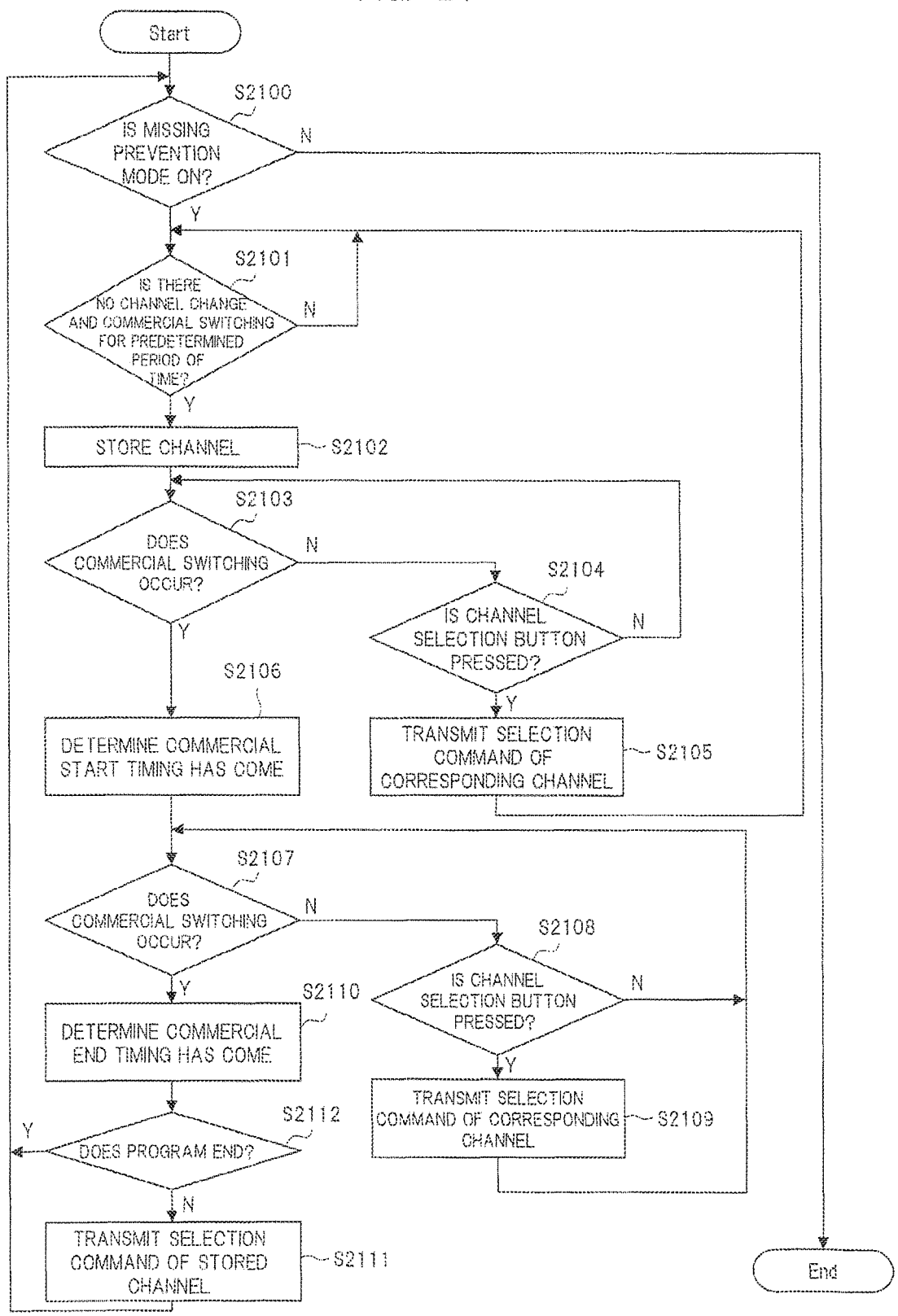
FIG. 21 is a flowchart illustrating a missing prevention process of a terminal apparatus according to the eleventh embodiment.

FIG. 21 is a flowchart illustrating a missing prevention process of the terminal apparatus 1.

When a missing prevention mode of the terminal apparatus 1 is ON in step S2100, the process proceeds to step S2101, and when the missing prevention mode is OFF, the process ends.

Since steps S2101 to S2105 are similar to steps S1601 to S1605 illustrated in FIG. 16, description thereof is omitted. Through steps S2101 to S2105, the terminal apparatus 1 detects the commercial switching after an elapse of a predetermined period of time without the channel change by the user, and determines that a commercial start timing has come (step S2106).

Since steps S2107 to S2109 are similar to steps S1607 to S1609 illustrated in FIG. 16, description thereof is omitted.

Through steps S2107 to S2109, the terminal apparatus 1 detects the commercial switching after the start of the commercial, and determines that a commercial end timing has come (step S2110).

Next, in step S2112, the process is changed depending on whether a program on an original channel has ended. When the program has not ended, the process proceeds to step S2111, and the terminal apparatus 1 transmits a selection command of the channel stored in the memory unit 25 to the video display apparatus 3 and repeats the process from step S2100. When the program has ended, the process does not proceed to step S2111, and the process from step S2100 is repeated.

By the foregoing configuration, in the eleventh embodiment of the present invention, a similar effect to that in the seventh embodiment can be obtained.

Furthermore, since the terminal apparatus 1 does not return the channel to the original channel when the program has ended, the terminal apparatus 1 does not erroneously switch the channel which the user wishes to view next.

Instead of the terminal apparatus 1, the video display apparatus 3 may store the channel when the channel is not changed for a predetermined period of time, and the video display apparatus 3 itself may detect the commercial end timing and switch the channel to a corresponding channel.

Twelfth Embodiment

Next, the twelfth embodiment of the present invention will be described below. A configuration, an effect, and the like in the present embodiment are similar to those in the seventh embodiment unless otherwise noted. Thus, a difference between the present embodiment and the seventh embodiment will be mainly described below.

Figure 22:
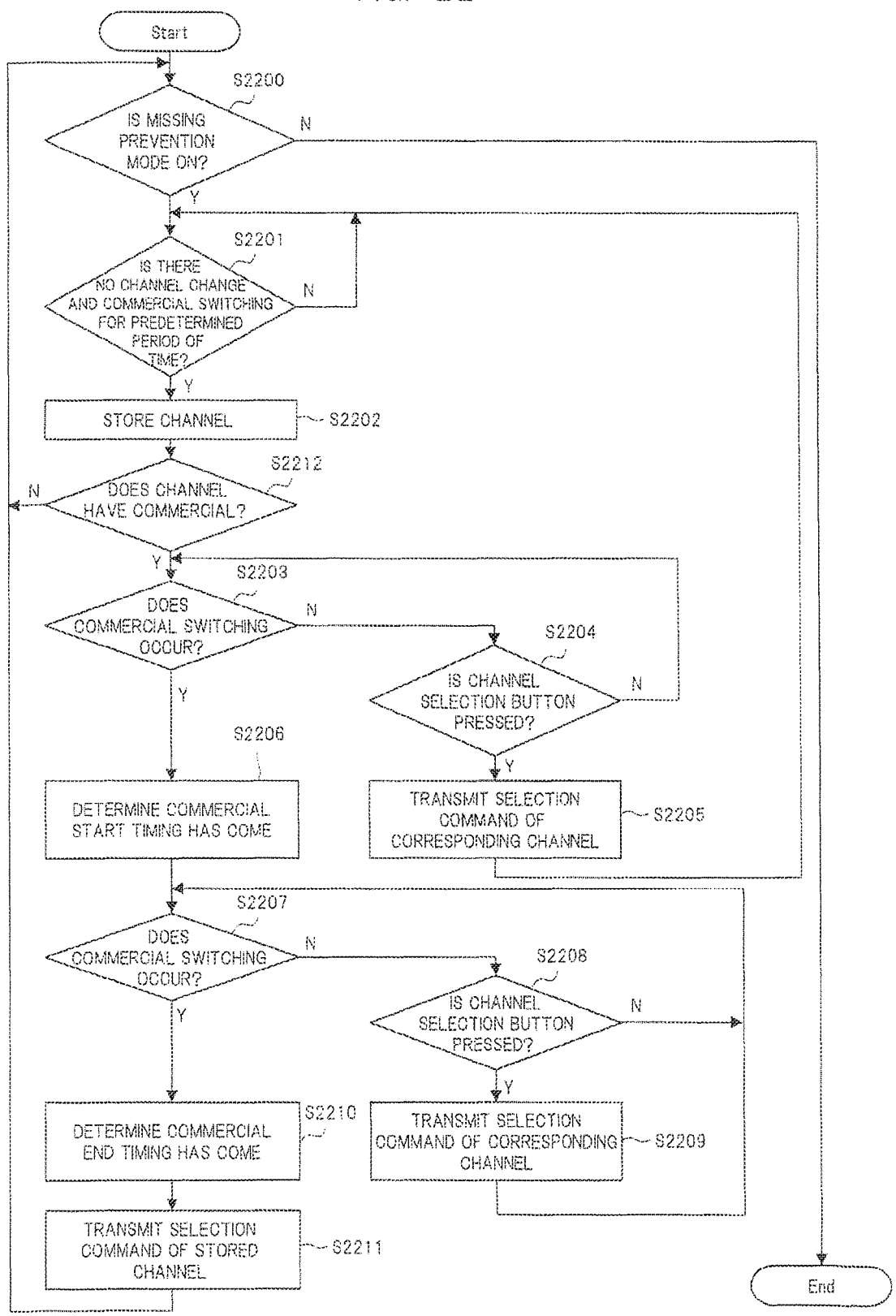
FIG. 22 is a flowchart illustrating a missing prevention process of a terminal apparatus according to the twelfth embodiment.

FIG. 22 is a flowchart illustrating a missing prevention process of the terminal apparatus 1.

When a missing prevention mode of the terminal apparatus 1 is ON in step S2200, the process proceeds to step S2201, and when the missing prevention mode is OFF, the process ends.

Since steps S2201 to S2202 are similar to steps S1601 to S1602 illustrated in FIG. 16, description thereof is omitted.

Next, in step S2212, the process is changed depending on whether the channel has a commercial. When the channel has a commercial, the process proceeds to step S2203, and when the channel has no commercial, the process does not proceed to step S2203 and the process from step S2200 is repeated. For example, whether or not the channel has a commercial can be determined by storing a list of channels having no commercial in the memory unit 25 in advance and comparing the list of channels with the channel stored in step S2202.

Since steps S2203 to S2205 are similar to steps S1603 to S1605 illustrated in FIG. 16, description thereof is omitted.

Through steps S2201 to S2205 and step S2212, the terminal apparatus 1 detects the commercial switching in the channel having a commercial after an elapse of a predetermined period of time without the channel change by the user, and determines that a commercial start timing has come (step S2206).

Since steps S2201 to S2205 are similar to steps S1601 to S1605 illustrated in FIG. 16, description thereof is omitted. Through steps S2201 to S2205, the terminal apparatus 1 detects the commercial switching after an elapse of a predetermined period of time without the channel change by the user, and determines that a commercial start timing has come (step S2206).

Since steps S2207 to S2209 are similar to steps S1607 to S1609 illustrated in FIG. 16, description thereof is omitted.

Through steps S2207 to S2209, the terminal apparatus 1 detects the commercial switching after the start of a commercial, and determines that a commercial end timing has come (step S2210).

Next, in step S2211, the terminal apparatus 1 transmits a selection command of the channel stored in the memory unit 25 to the video display apparatus 3, and repeats the process from step S2200.

By the foregoing configuration, in the twelfth embodiment of the present invention, a similar effect to that in the seventh embodiment can be obtained.

Furthermore, since the terminal apparatus 1 does not perform the missing prevention process for the channel having no commercial, the missing prevention process is not erroneously performed when the channel is switched to the channel having no commercial. Since there is a scene change where an audio is silent even on the channel having no commercial, there is the possibility that the terminal apparatus 1 determines that the commercial switching has occurred, but it is possible to prevent this.

Instead of the terminal apparatus 1, the video display apparatus 3 may store the channel when the channel is not changed for a predetermined period of time, and the video display apparatus 3 itself may detect the commercial end timing and switch the channel to a corresponding channel.

Also, instead of the configuration in which the terminal apparatus 1 or the video display apparatus 3 switches the channel in response to the commercial end timing, the user may be notified of the end of the commercial by a video or an audio, and the user himself/herself may operate the terminal apparatus 1 to switch the channel.

Thirteenth Embodiment

Next, the thirteenth embodiment of the present invention will be described below. A configuration, an effect, and the like in the present embodiment are similar to those in the seventh embodiment unless otherwise noted. Thus, a difference between the present embodiment and the seventh embodiment will be mainly described below.

Figure 24:
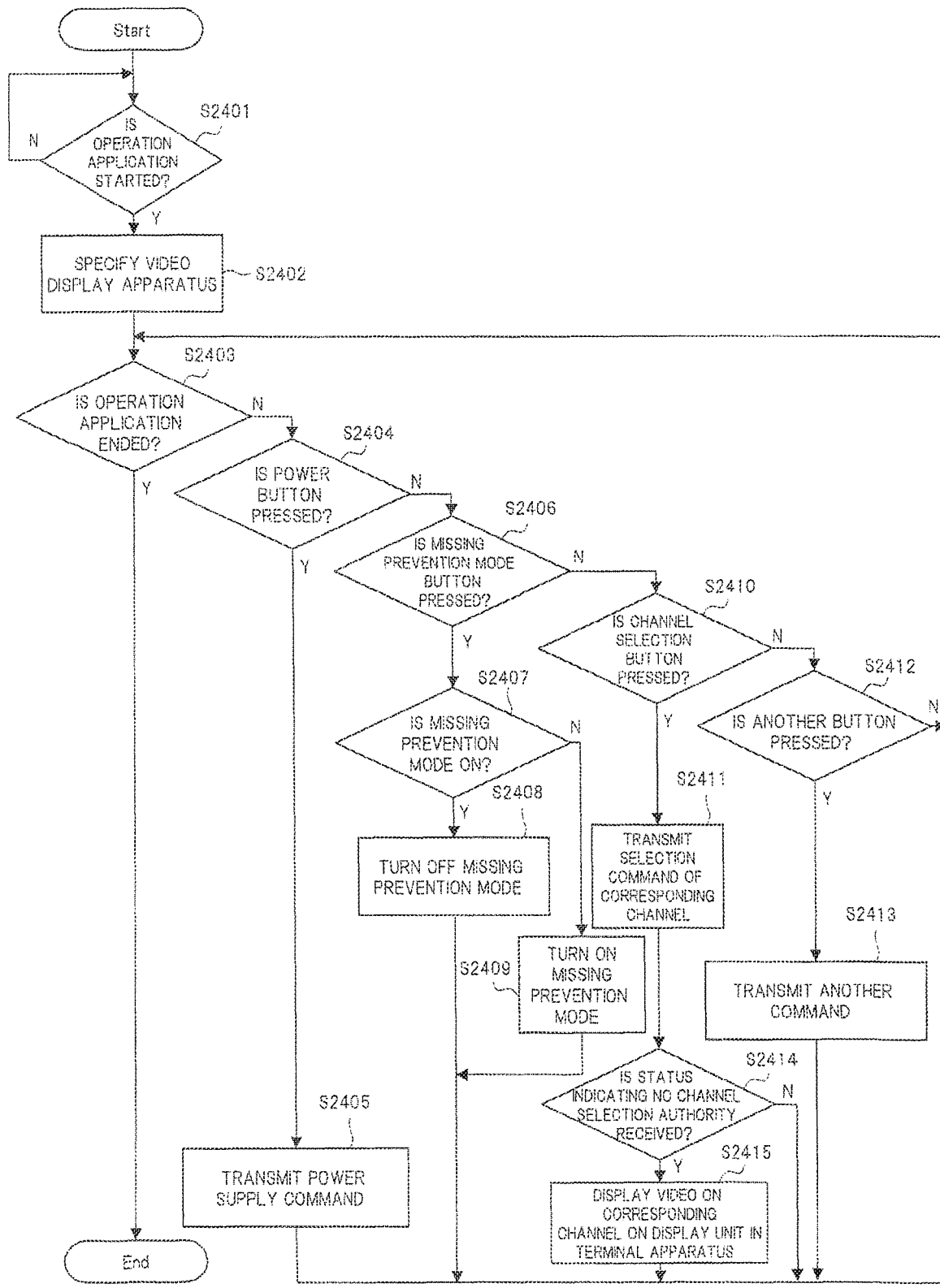
FIG. 24 is a flowchart illustrating a process of a terminal apparatus according to the thirteenth embodiment.

FIG. 24 is a flowchart illustrating an operation of the terminal apparatus 1 when the terminal apparatus 1 remotely controls the video display apparatus 3.

Since steps S2401 to S2409 are similar to steps S1501 to S1509 illustrated in FIG. 15, description thereof is omitted.

In step S2410, the terminal apparatus 1 confirms whether a user has pressed a channel selection button of a remote control function. When the user has pressed a channel selection button such as a "1" button or a "2" button displayed on the terminal apparatus 1, the process proceeds to step S2411. Since step S2411 is similar to step S1511 illustrated in FIG. 15, description thereof is omitted.

Next, in step S2414, the process is changed depending on whether the terminal apparatus 1 has received a status indicating that there is no channel selection authority. Only when the status has been received, the process proceeds to step S2415, and a video on a corresponding channel is displayed on the display unit 22 in the terminal apparatus 1. Then, the process from step S2403 is repeated. The status indicating that there is no channel selection authority is sent from the video display apparatus 3 when there is no channel selection authority.

When the user has not pressed the channel selection button of a remote control function displayed on the terminal apparatus 1 in step S2410, the process proceeds to step S2412. Since steps S2412 to S2413 are similar to steps S1512 to S1513 illustrated in FIG. 15, description thereof is omitted.

Thus, when there is no channel selection authority of the video display apparatus 3, the video on the corresponding channel is displayed on the terminal apparatus 1.

Figure 25:
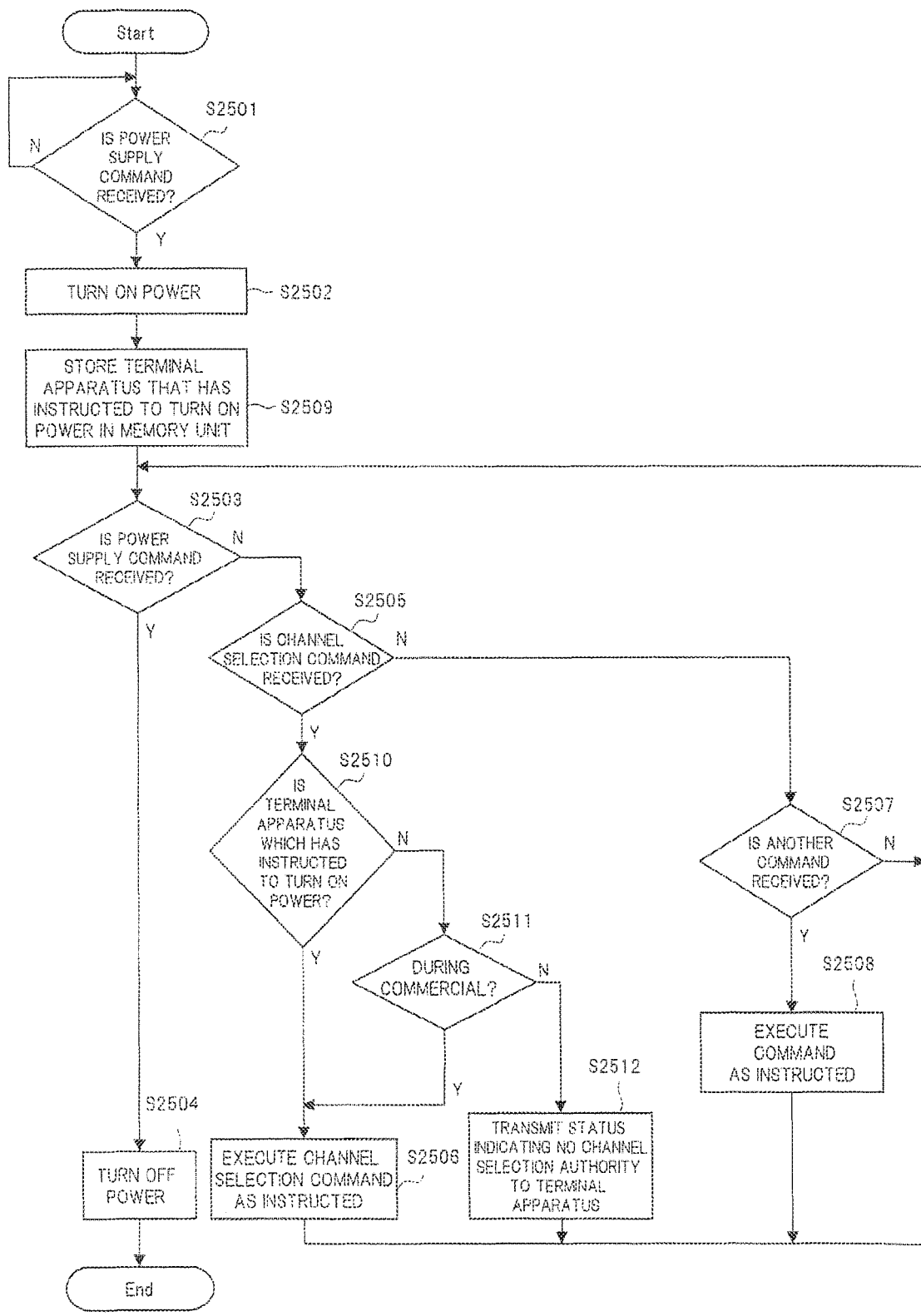
FIG. 25 is a flowchart illustrating a process of a video display apparatus according to the thirteenth embodiment.

FIG. 25 is a flowchart illustrating an operation of the video display apparatus 3.

In step S2501, the video display apparatus 3 waits for receiving of a power supply command. When the power supply command has been received, the video display apparatus 3 is powered on (step S2502), and stores, in the memory unit 35, information indicating which of terminal apparatuses 1 has transmitted the power supply command, namely, an identification code which has been transmitted together with the power supply command (step S2509). Here, it is assumed that the terminal apparatus 1a has transmitted the power supply command.

An IP (Internet Protocol) address, an ID (Identification) individually assigned to the terminal apparatus 1, a telephone number and the like are applicable to the identification code. Generally, since it is assumed that one user possesses one terminal apparatus 1, a user ID given to each user by a manufacturer of the terminal apparatus 1 may be applied. In this case, the user ID is previously stored in the terminal apparatus 1 based on an operation by the user or the like.

Since steps S2503 to S2504 are similar to steps S1703 to S1704 illustrated in FIG. 17, description thereof is omitted.

Next, in step S2505, the video display apparatus 3 confirms whether a channel selection command has been received. When the channel selection command has been received, the video display apparatus 3 confirms whether the channel selection command is a setting command from a specific terminal apparatus 1, namely, the terminal apparatus 1 that has issued an instruction to turn on power (step S2510). When the channel selection command is the setting command from the terminal apparatus 1 that has issued the instruction to turn on power, the video display apparatus 3 executes the channel selection command as instructed (step S2506), and repeats the process from step S2503.

When the channel selection command is not the setting command from the terminal apparatus 1 that has issued the instruction to turn on power in step S2510, the video display apparatus 3 confirms whether a channel being displayed is during a commercial (step S2511). When the channel is during the commercial, the video display apparatus 3 executes the command as instructed (step S2506), and repeats the process from step S2503. When the channel is not during the commercial, the video display apparatus 3 sends status information indicating that there is no channel selection authority to the corresponding terminal apparatus 1 (step S2512), and then repeats the process from step S2503. Whether the channel is during the commercial may be transmitted from the terminal apparatus 1 in addition to being determined by the video display apparatus 3.

Since steps S2507 to S2508 are similar to steps S1707 to S1708 illustrated in FIG. 17, description thereof is omitted.

Thus, selection of the channel of the video display apparatus 3 can be performed only when it is instructed from the terminal apparatus 1a that has powered on the video display apparatus 3 during a television program, and can be performed also when it is instructed from the terminal apparatus 1b in addition to the terminal apparatus 1a during a commercial. Also, an operation other than the selection of the channel can be performed from both of the terminal apparatus 1a and the terminal apparatus 1b.

By the foregoing configuration, in the thirteenth embodiment of the present invention, a similar effect to that in the seventh embodiment can be obtained.

Furthermore, the selection of the channel of the video display apparatus 3 can be performed only when it is instructed from the terminal apparatus 1a that has powered on the video display apparatus 3 during a television program, and a video is displayed on the terminal apparatus 1b when it is instructed from the terminal apparatus 1b. In addition, during the commercial, the channel selection can be performed also when it is instructed from the terminal apparatus 1b in addition to the terminal apparatus 1a.

Fourteenth Embodiment

Figure 26:
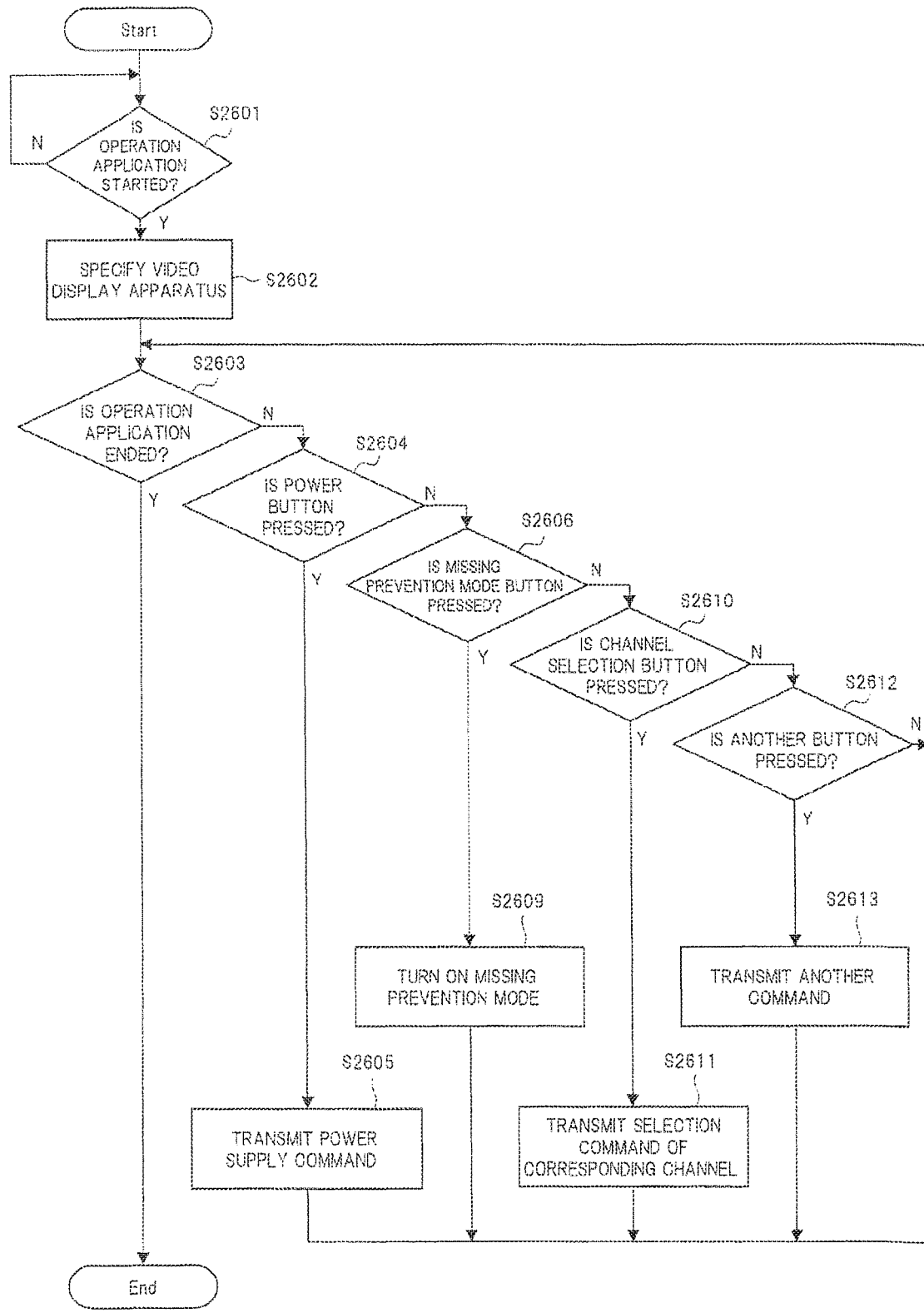
FIG. 26 is a flowchart illustrating a process of a terminal apparatus according to the fourteenth embodiment.

FIG. 26 is a flowchart illustrating an operation of the terminal apparatus 1 when the terminal apparatus 1 remotely controls the video display apparatus 3.

Since steps S2601 to S2605 are similar to steps S1501 to S1505 illustrated in FIG. 15, description thereof is omitted.

In step S2606, the terminal apparatus 1 confirms whether a user has pressed a "missing prevention" mode button. When the user has pressed the "missing prevention" mode button displayed on the terminal apparatus 1, the terminal apparatus 1 turns on a missing prevention mode, and repeats the process from step S2603.

When the user has not pressed the "missing prevention" mode button displayed on the terminal apparatus 1, the process proceeds to step S2610. Since steps S2610 to S2613 are similar to steps S1510 to S1513 illustrated in FIG. 15, description thereof is omitted.

Figure 27:
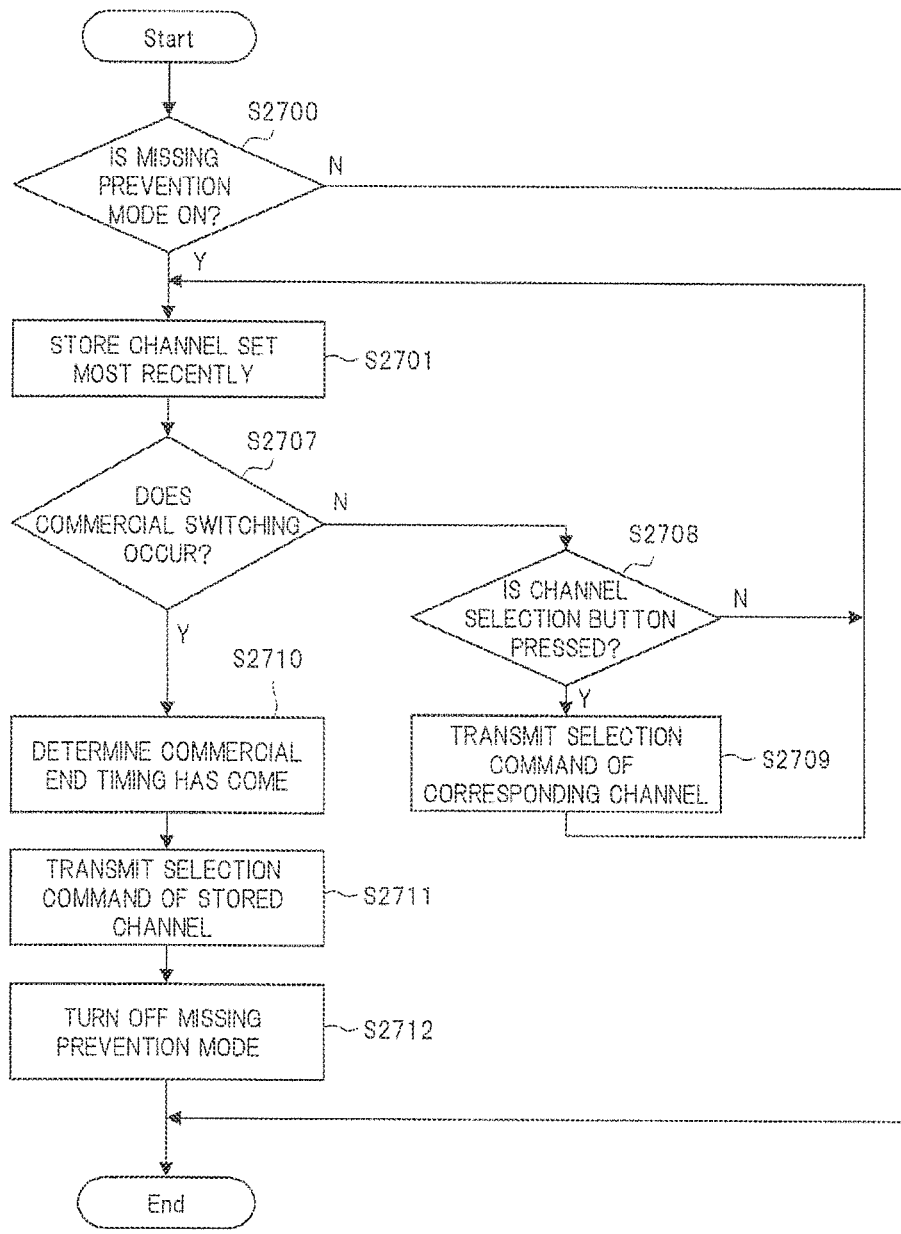
FIG. 27 is a flowchart illustrating a missing prevention process of the terminal apparatus according to the fourteenth embodiment.

FIG. 27 is a flowchart illustrating a missing prevention process of the terminal apparatus 1.

When the missing prevention mode of the terminal apparatus 1 is ON in step S2700, the process proceeds to step S2701, and when the missing prevention mode is OFF, the process ends.

In step S2701, the terminal apparatus 1 stores a channel previously set by the user.

Since steps S2707 to S2710 are similar to steps S1507 to S1510 illustrated in FIG. 15, description thereof is omitted. Through steps S2707 to S2709, the terminal apparatus 1 detects commercial switching after the start of a commercial, and determines that a commercial end timing has come (step S2710).

Next, in step S2711, the terminal apparatus 1 transmits a selection command of the channel stored in the memory unit 25 to the video display apparatus 3, and turns off the missing prevention mode in step S2712. When the channel selection button of a remote control function has not been pressed in step S2708, the selection command of the channel stored in the memory unit 25 does not have to be transmitted to the video display apparatus 3.

By the foregoing configuration, in the fourteenth embodiment of the present invention, the terminal apparatus 1 stores the channel which is being viewed when the user has pressed the "missing prevention" mode button, and transmits the selection command of the channel to the video display apparatus 3 in response to the timing of the end of the commercial.

If the user has pressed the "channel" button after pressing the "missing prevention" mode button during the commercial, the channel returns to the channel prior to the switching at the end of the commercial even when the user switches the channel during the commercial. Thus, it is possible to prevent the television program on the channel which has been being viewed by the user from being missed.

Furthermore, when the "missing prevention" mode button is pressed during the commercial, a missing prevention mode is entered, and the missing prevention mode is canceled when the commercial ends. Therefore, the power consumption of the terminal apparatus 1 can be suppressed.

Instead of the terminal apparatus 1, the video display apparatus 3 may store the channel, and the video display apparatus 3 itself may detect the commercial end timing and switch the channel.

Also, instead of the configuration in which the terminal apparatus 1 or the video display apparatus 3 switches the channel in response to the commercial end timing, the user may be notified of the end of the commercial by a video or an audio, and the user himself/herself may operate the terminal apparatus 1 to switch the channel.

Note that the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

Some or all of the above-mentioned configurations, functions, processing units, and processing means may be implemented by hardware by designing them with integrated circuits or the like.

Also, the above-mentioned configurations and functions may be implemented by software by interpreting and executing programs for implementing the respective functions by processors. Information such as a program, a table, a file, and the like for implementing each of the functions can be placed in a recording device such as a memory, a hard disk, or an SSD (Solid State Drive) or a recording medium such as an IC card or an SD card.

Control lines and information lines, which are considered to be necessary in description, are illustrated, and all control lines and information lines in products are not necessarily illustrated. In practice, it is right to think that almost all configurations are connected to one another.

REFERENCE SIGNS LIST

1 . . . TERMINAL APPARATUS, 2 . . . REMOTE CONTROLLER, 3 . . . VIDEO DISPLAY APPARATUS, 5 . . . BROADCAST STATION, 6 . . . WIRELESS ROUTER, 7 . . . NETWORK, 20 . . . CONTROL UNIT, 21 . . . TELEVISION SIGNAL RECEIVING UNIT, 22 . . . DISPLAY UNIT, 23 . . . AUDIO OUTPUT UNIT, 24 . . . OPERATION UNIT, 25 . . . MEMORY UNIT, 26 . . . LAN COMMUNICATION UNIT, 30 . . . CONTROL UNIT, 31 . . . TELEVISION SIGNAL RECEIVING UNIT, 32 . . . DISPLAY UNIT, 33 . . . AUDIO OUTPUT UNIT, 34 . . . INFRARED COMMUNICATION UNIT, 35 . . . MEMORY UNIT, 36 . . . LAN COMMUNICATION UNIT

What is claimed is:

1. A video display apparatus comprising:
a display configured to display a video content from a broadcast station or from a video content delivery source;
a speaker configured to output an audio; and
a transceiver configured to execute 1) first bi-directional wireless communication using a first wireless control device via a router and 2) second bi-directional wireless communication via a router using a second wireless control device, the second wireless control device being different from the first wireless control device,
wherein the video display apparatus has a first state, a second state, and a third state,
wherein, in the first state, when a first command for changing a video content on the display of the video display apparatus, which is turned on by the first wireless control device, from a first video content selected by the first wireless control device to a second video content is transmitted from the first wireless control device to the transceiver while the first video content is being displayed on the display, the display terminates displaying the first video content and starts displaying the second video content,
wherein, in the second state, when a second command for changing the video content on the display of the video display apparatus, which is turned on by the first wireless control device, from the first video content selected by the first wireless control device to the second video content is transmitted from the second wireless control device to the transceiver while the first video content is being displayed on the display, the transceiver sends, to the second wireless control device, first information informing that the second wireless control device has no selection authority to change the video content on the display of the video display apparatus turned on by the first wireless control device, wherein, in the third state, when the second command for changing the video content on the display of the video display apparatus, which is turned on by the first wireless control device, from the first video content selected by the first wireless control device to the second video content is transmitted from the second wireless control device to the transceiver while advertisement accompanying the first video content is being displayed on the display, 1) the display terminates displaying the first video content and starts displaying the second video content and 2) the transceiver sends, to the first wireless control device, second information informing the first wireless control device of termination of the displaying of the first video content, and wherein both of the first command and the second command are different from an audio volume setting command.

2. The video display apparatus according to claim 1, further comprising:

a memory configured to store identification information for identifying the first wireless control device.

3. The video display apparatus according to claim 1, further comprising:

a memory configured to store identification information for identifying the second wireless control device.

4. The video display apparatus according to claim 1, wherein both of the first bidirectional wireless communication and the second bi-directional wireless communication are conducted as wireless LAN communication with Wi-Fi method.

* * * * *